(12) United States Patent
Zhang et al.

(10) Patent No.: US 12,422,385 B2
(45) Date of Patent: Sep. 23, 2025

(54) ESTIMATION OF THE CRYSTALLOGRAPHIC TEXTURE OF AN ALLOY

(71) Applicant: The Boeing Company, Arlington, VA (US)

(72) Inventors: Yunpeng Zhang, Brisbane (AU); Michael C. Elford, Brisbane (AU); Andrew Jon Eugene Stephan, Annerley (AU)

(73) Assignee: The Boeing Company, Arlington, VA (US)

( * ) Notice: Subject to any disclaimer, the term of this patent is extended or adjusted under 35 U.S.C. 154(b) by 211 days.

(21) Appl. No.: 18/457,136

(22) Filed: Aug. 28, 2023

(65) Prior Publication Data

US 2025/0076224 A1 Mar. 6, 2025

(51) Int. Cl.
*G01N 23/20* (2018.01)
(52) U.S. Cl.
CPC .................................. *G01N 23/20* (2013.01)
(58) Field of Classification Search
None
See application file for complete search history.

(56) References Cited

U.S. PATENT DOCUMENTS

| | | |
|---|---|---|
| 11,093,550 B2 | 8/2021 | Zhang et al. |
| 2021/0279375 A1* | 9/2021 | Sakaki ..................... G06F 30/10 |
| 2024/0002981 A1* | 1/2024 | Tsukamoto ............. C22F 1/183 |
| 2025/0076227 A1* | 3/2025 | Glavicic ................. C22C 14/00 |

* cited by examiner

*Primary Examiner* — Hoon K Song
(74) *Attorney, Agent, or Firm* — Yee & Associates, P.C.

(57) ABSTRACT

A modified differential evolution process including a reseed operation is performed to estimate a plurality of Euler angles indicating orientations of a specified quantity of crystals approximating the crystallographic texture extracted from the material test data, the reseed operation comprising retaining a data point at a first place of a first population of data points, and replacing all other data points of the first population of data points prior to continued iterations, wherein the first population of data points is a collection of a plurality of all data points and each data point comprises the specified quantity of Euler angles, and the data point at the first place of the first population of data points is the data point within the first population of data points that best fits the material test data.

20 Claims, 18 Drawing Sheets

ESTIMATION OF THE CRYSTALLOGRAPHIC TEXTURE OF AN ALLOY

BACKGROUND INFORMATION

1. Field

The present disclosure relates generally to estimating crystallographic texture of an alloy and more specifically to methods for estimating a crystallographic texture of an alloy using a modified differential evolution process.

2. Background

The crystallographic texture of an alloy affects material properties of the material. For example, the crystallographic texture can affect at least one of the following: the necking limit, anisotropic material properties, fatigue, creep under high temperature, or phase transformation of an alloy. Commercial metal sheets can have non-uniform crystallographic texture due to the rolling process and the thermomechanical treatment.

Understanding crystallographic texture of an alloy is of significance in some situations. For example, engineers can better design, control, or optimize the manufacturing processes of parts made of a specific alloy when they can quantify and understand how the material properties will be affected by the change of its crystallographic texture. Engineers can quantify and understand how the material properties will be affected through executing an advanced crystal-scale material model (ACSMM) such as the crystal plasticity finite element method. However, it is a challenging and time-consuming task to estimate the crystallographic texture of an alloy as the input of ACSMM.

Therefore, it would be desirable to have a method and apparatus that takes into account at least some of the issues discussed above, as well as other possible issues. More specifically, it would be desirable to have an automatable and efficient method and apparatus which can be applied to estimate crystallographic texture of a plurality of alloys.

SUMMARY

An embodiment of the present disclosure provides a computer-implemented method of estimating the crystallographic texture of an alloy. Material test data of a material sample of the alloy is obtained. A modified differential evolution process including a reseed operation is performed to estimate a plurality of Euler angles indicating orientations of a specified quantity of crystals approximating the crystallographic texture extracted from the material test data. The reseed operation comprises retaining a data point at a first place of a first population of data points and replacing all other data points of the first population of data points prior to continued iterations, wherein the first population of data points is a collection of a plurality of all data points and each data point comprises the specified quantity of Euler angles, and the data point at the first place of the first population of data points is the data point within the first population of data points that best fits the material test data.

Another embodiment of the present disclosure provides a computer program product for performing a modified differential evolution process to estimate the crystallographic texture of an alloy. The computer program product comprises a computer-readable storage medium having program instructions embodied thereon to perform the steps of receiving material test data of a material sample of the alloy; and performing a modified differential evolution process including a reseed operation to estimate a plurality of Euler angles indicating the orientations of a specified quantity of crystals approximating the crystallographic texture extracted from the material test data; the reseed operation comprising retaining a data point at the first place of a first population of data points, and replacing all other data points of the first population of data points prior to continued iterations.

A further embodiment of the present disclosure provides a system for performing a modified differential evolution process to estimate crystallographic texture of an alloy. The system comprising: a storage device that stores program instructions; and a number of processors operably connected to the storage device and configured to execute the program instructions to cause the system to: receive material test data of a material sample of the alloy; and perform a modified differential evolution process including a reseed operation to estimate a plurality of Euler angles indicating the orientations of a specified quantity of crystals approximating the crystallographic texture extracted from the material test data; the reseed operation comprising retaining a data point at a first place of a first population of data points, and replacing all other data points of the first population of data points prior to continued iterations.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account several considerations. For example, the illustrative examples recognize and take into account that a popular option for estimating crystallographic texture of an alloy is using a harmonic/spectral method, such as spherical harmonic approximation method. However, the illustrative examples recognize and take into account that there are undesirable aspects to the harmonic approximation method.

First, the harmonic method implicitly assumes crystallographic texture of an alloy can be represented by smooth functions describing crystal orientation distributions. The illustrative examples recognize and take into account that the functions representing crystal orientation distributions of an alloy are often discrete and noisy. The illustrative examples recognize and take into account that the differences between the assumed smooth function representing crystal orientation distributions and actual function representing crystal orientation distributions would influence the quality of the recomputed crystallographic texture, and subsequently any results obtained from crystal-modeling.

Second, the illustrative examples recognize and take into account that the harmonic method requires a large number of pole figures (projections of distributions of crystal orientations of an alloy) to obtain a solution when handling low symmetry crystals. For example, hexagonal close-packed (hcp) crystals require at least four pole figures. The illustrative examples recognize and take into account that the quantity of pole figures needed can limit the flexibility of the harmonic method in estimating the crystallographic texture of different types of crystal structures.

The illustrative examples recognize and take into account that the harmonic method often results in unrealistic results such as negative values in functions representing crystal orientation distributions (i.e. ghost phenomenon). As a result, the illustrative examples recognize and take into account that an alternative approach would be desirable to determine crystallographic texture of an alloy to control the quality of the advanced crystal-scale material model (ACSMM) results.

The illustrative examples provide a novel evolutionary algorithm which can be used to automatically and effectively estimate a plurality of Euler angles representing the crystal orientation distributions of alloy as the input for ACSMM. The illustrative examples perform a reseed operation to repopulate the first population of data points other than a data point in a first place of the first population of data points. Utilizing reseeding reduces the chance of identifying local optimal solutions rather than a global optimal solution. The illustrative examples improve the evolutionary algorithm by increasing the chance of identification of the global optimal solution in a high dimensional optimization problem.

Figure 1:
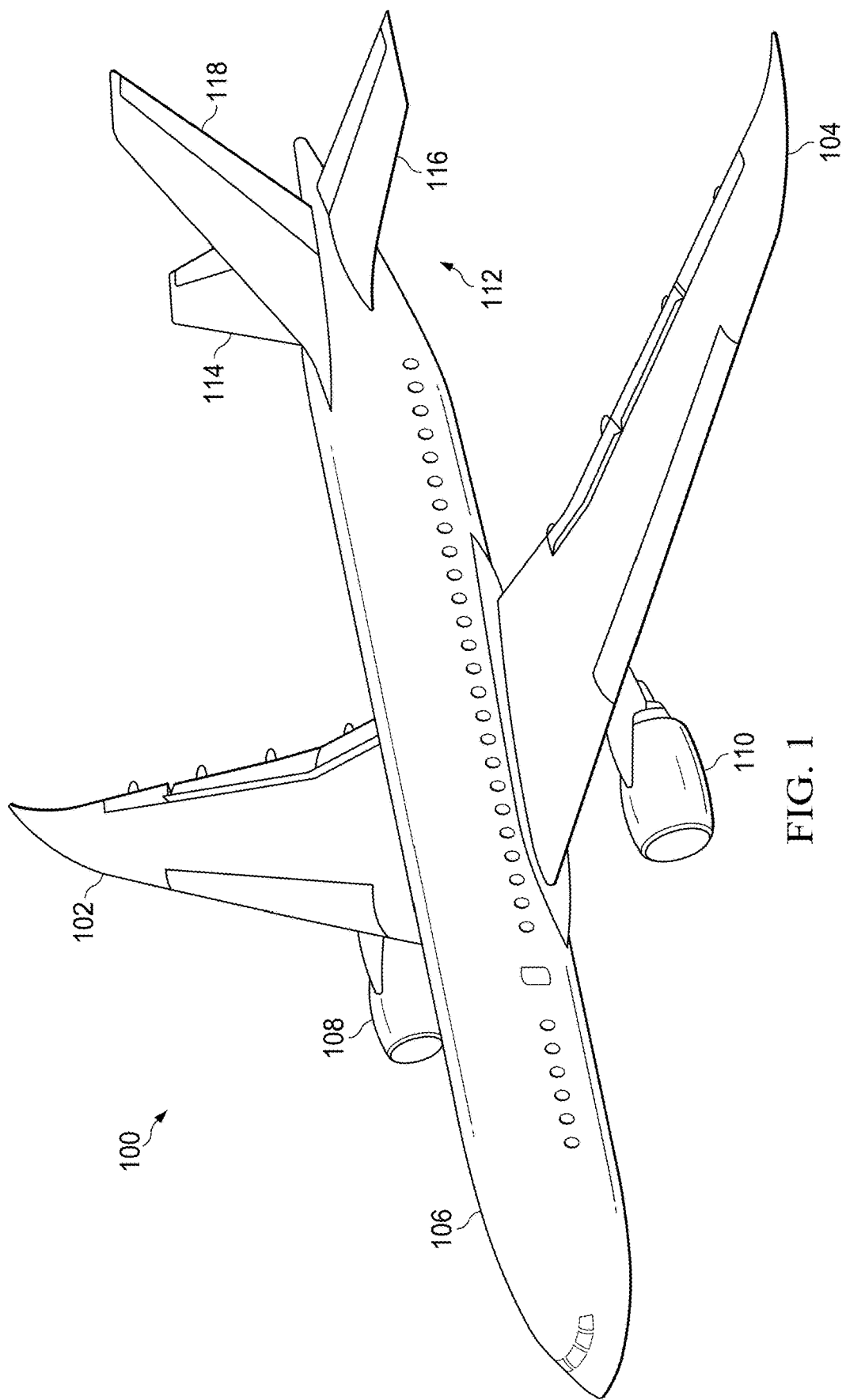
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Figure 3:
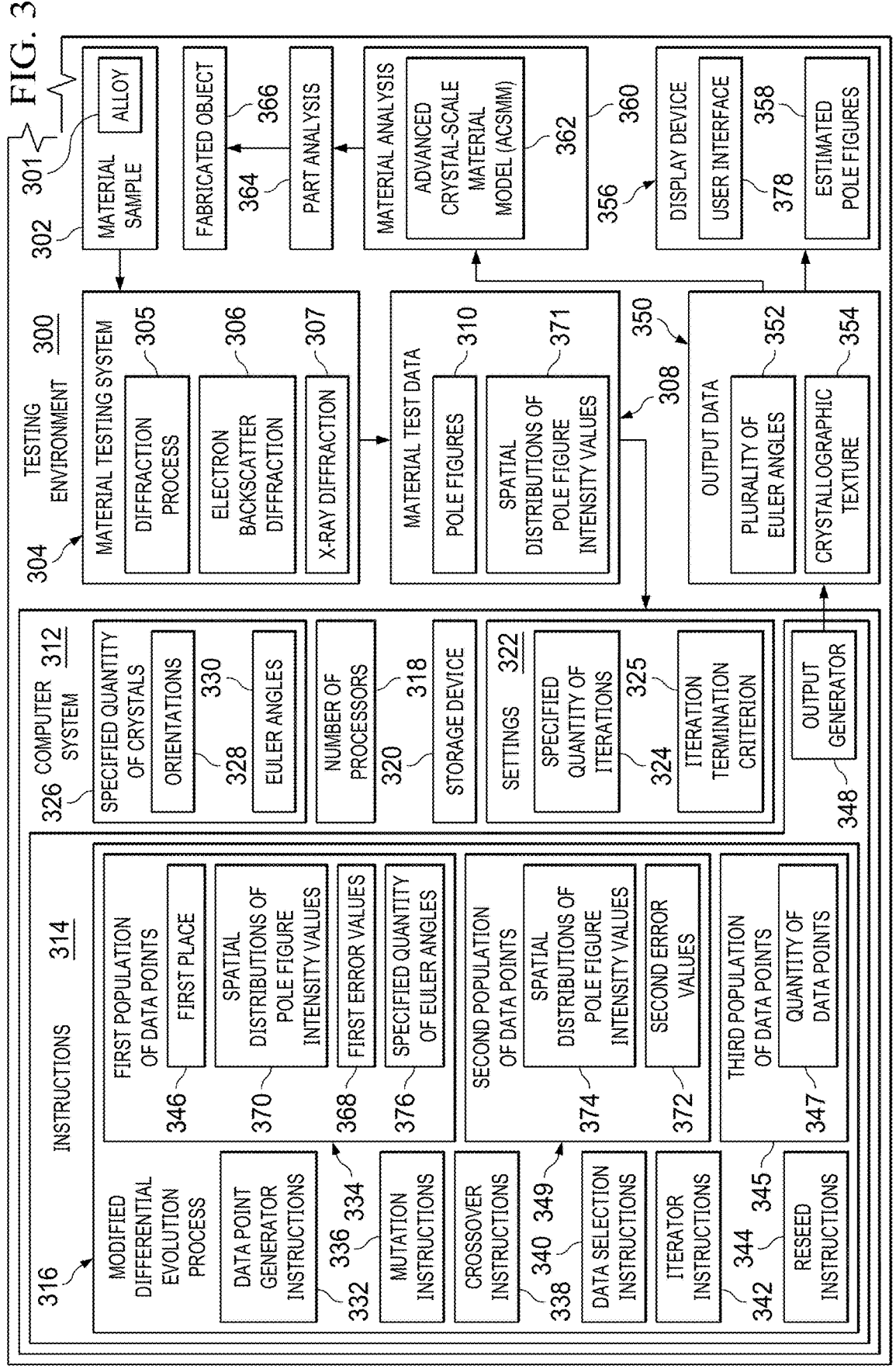
FIG. 3 is an illustration of a block diagram of a testing environment in accordance with an illustrative embodiment.

Aircraft 100 is an example of an aircraft that can have materials analyzed using the illustrative examples. In some illustrative examples, at least one metal sheet of aircraft 100 had its properties analyzed based on a material analysis 360 in FIG. 3 by using ACSMM with the inputs from a plurality of Euler angles as the output data 350 of FIG. 3 representing an estimated crystallographic texture from the illustrative examples.

Figure 2:
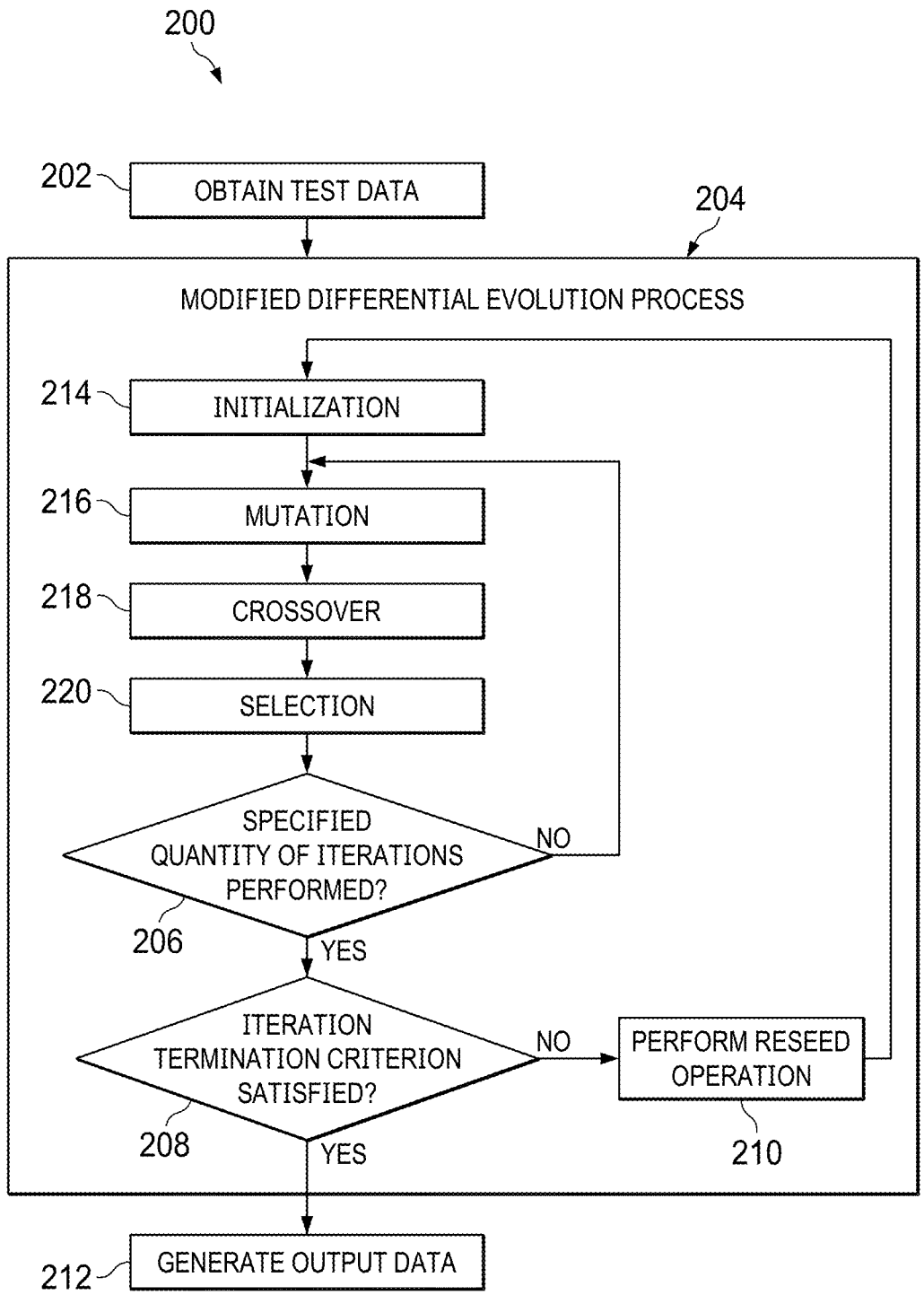
FIG. 2 is an illustration of a flowchart of a modified differential evolution process in accordance with an illustrative embodiment.

Turning now to FIG. 2, an illustration of a flowchart of a modified differential evolution process is depicted in accordance with an illustrative embodiment. Method 200 can be performed to estimate the crystallographic texture based on the obtained test data. The properties of a metal component of aircraft 100 of FIG. 1 can then be modeled by using ACSMM with the inputs from a plurality of Euler angles as the output data 350 of FIG. 3 representing an estimated crystallographic texture using method 200.

In operation 202, material test data is obtained. The material test data is from a material sample of an alloy. In some illustrative examples, the material test data can be generated through a diffraction process. Material test data obtained in operation 202 is supplied to modified differential evolution process 204 to estimate the crystallographic texture of the test material.

In some illustrative examples, obtaining material test data of the material sample comprises obtaining pole figures. The pole figures can be a stereographic projection or an equal area projection (Schmidt projection) of distributions of crystal orientations of an alloy from a diffraction process. In some illustrative examples, the diffraction process is one of X-ray diffraction or electron backscatter diffraction.

A modified differential evolution process 204 is performed. Modified differential evolution process 204 is performed iteratively. Modified differential evolution process 204 including a reseed operation 210 is performed to estimate a plurality of Euler angles indicating orientations of a specified quantity of crystals approximating the crystallographic texture extracted from the material test data. In some illustrative examples, the plurality of Euler angles estimated are Bunge Euler angles. Reseed operation 210 comprises retaining a data point at a first place of a first population of data points and replacing all other data points of the first population of data points prior to continued iterations, wherein the first population of data points is a collection of a plurality of all data points and each data point comprises the specified quantity of Euler angles, and the data point at the first place of the first population of data points is the data point within the first population of data points that best fits the material test data.

Modified differential evolution process 204 comprises initialization 214, mutation 216, crossover 218, and selection 220. In initialization 214, a first population of data points is generated. In some illustrative examples, generating the first population of data points is performed by randomly drawing a plurality of Euler angles for each data point of the first population of data points within given bounds. The first population of data points comprises a first quantity of data points. Each data point of the first population of data points comprises a specified quantity of Euler angles.

In some illustrative examples, a specified quantity of crystals for the modified differential evolution process is received, and the specified quantity of Euler angles is set equal to three times the specified quantity of crystals. Mutation 216, crossover 218, and selection 220 can be performed iteratively in modified differential evolution process 204.

The following illustrative examples refer to evolutionary processes. As used herein, "evolutionary processes" are operations that manipulate data in a manner that mimics modification, inheritance, and survival features of natural processes. Evolutionary processes, as used herein, generally use mutation, crossover, and selection operations on an initial data set to generate a new data set. The initial data set can be referred to herein as a "first population of data points". The initial data set comprises a plurality of data points.

In the illustrative examples, mutation refers to modifying the data set in a manner that is structured, random within defined parameters, or structured with some random aspects. Modifying the data set includes modifying one or more data points within the data set. For example, in one illustrative example, a structured process of mutation can be used; however, the data points within the data set that are used in the structured process are randomly selected.

Crossover in the illustrative examples refers to intermixing aspects of two or more data points of the data set. In some illustrative examples, each data point corresponds to or can be represented by a vector including multiple values, and crossover is performed by generating a new data point (e.g., a new vector) that includes values from each of two or more other data points.

Selection in the illustrative examples refers to determining which of two or more data points is to be included in a subsequent data set (e.g., the next population of data points). The selection can be structured (e.g., a data point with a smallest error value is selected), random, or structured with random aspects (e.g., error values of data points are randomly weighted before selection based on the error values).

The illustrative examples utilize evolutionary search processes. An evolutionary search process is a set of search or optimization operations that include evolutionary processes. For example, an evolutionary search process uses evolutionary processes to generate a sequence of data sets (e.g., populations of data points) to converge toward a result.

One advantage of evolutionary search processes, as compared to gradient based optimization processes, such as Newton-Raphson optimization techniques, is that evolutionary search processes do not need to calculate the gradient or Hessian matrix of the objective function which are computationally expensive. A technical benefit of the evolutionary search process is that the evolutionary search process can be applied directly to find the crystal orientation distributions (or crystallographic texture) of an alloy which are discrete, noisy and with only positive values without the need of modifications. Further, the functions (the objective and the kernel functions) used in an evolutionary search process do not need to be differentiable whereas the harmonic method based on the Newton-Raphson optimization techniques only work with differentiable functions. Additionally, harmonic method requires an initial guess as seed values. If a poor seed is selected, the results from harmonic methods can be poor quality which can be problematic.

In some illustrative examples, performing modified differential evolution process 204 comprises iteratively performing mutation 216, crossover 218, and data selection 220 steps on the first population of data points for specified quantity of iterations. At decision 206, it is determined if a specified quantity of iterations has been performed. If the specified quantity of iterations has not been performed, mutation 216, crossover 218, and selection 220 are performed again.

In some illustrative examples, data selection 220 step comprises moving a data point in the first population of data points with a smallest error to the first place of the first population of data points after performing mutation and crossover steps.

In some illustrative examples, the mutation 216, crossover 218, and data selection 220 steps comprise determining first error values indicative of how closely the spatial distributions of pole figure intensity values derived from the distribution of Euler angles contained in each data point in the first population of data points represents the respective spatial distributions of pole figure intensity values based on the material test data; generating a second plurality of data points to form a second population of data points; determining second error values indicative of how closely the spatial distributions of pole figure intensity values derived from the distribution of Euler angles contained in each data point in the second population of data points represents the respective spatial distributions of pole figure intensity values based on the material test data; and replacing respective data points in the first population of data points by respective data points of the second population of data points having smaller respective second error values than respective first error values associated with the respective data points in the first population of data points.

In some illustrative examples, the material test data comprises at least one pole figure. In some illustrative examples, data selection 220 comprises generating spatial distributions of pole figure intensity values for each data point of the first population of data points to form a first set of spatial distributions of pole figure intensity values, wherein the spatial distribution of pole figure intensity values are a plurality of two-dimensional graphical representations associated with a plurality of respective pole figures (e.g. stereographic or equal area projections of crystal orientation distributions)—either derived from a data point, or from the material test data. In some illustrative examples, determining the first error value for each data point of the first population of data points in data selection 220 further comprises comparing a plurality of spatial distributions of pole figure intensity values derived from the first population of data points to spatial distributions of pole figure intensity values associated with the respective test data.

In some illustrative examples, in at least one of mutation 216 or crossover 218, generating the second population of data points comprises selecting a percentage of data points randomly drawn from the first population of data points; modifying each selected data point by adding a fraction of differences of two of the other randomly selected data points from the first population of data points to form a portion of the second population of data points; and adding remaining data points from the first population of data points to the second population of data points.

Operations performed by the modified differential evolution process 204 are performed iteratively until specified quantity of iterations is satisfied at decision 206. Instructions are executable by a number of processors, such as number of processors 318 of FIG. 3, to determine whether the specified quantity of iterations is satisfied. When the specified quantity of iterations has been satisfied at decision 206, iteration of the operations mutation 216, crossover 218, and selection 220 is stopped. When the specified quantity of iterations of decision 206 is reached, method 200 moves on to decision 208. In decision 208, it is determined if the iteration termination criterion has been satisfied. In some illustrative examples, the iteration termination criterion of decision 208 comprises a convergence threshold. When a specified quantity of iterations has been met at decision 206, but iteration termination criterion has not been met at decision 208, method 200 performs reseed operation 210. In response to determining iteration termination criterion is not satisfied at decision 208 after the specified quantity of iterations at decision 206, reseed operation 210 is performed in which the data point at the first place of the first population of data points is retained and all other data points in the first population of data points are replaced.

Reseed operation 210 is implemented to increase the chance of finding a global optimal solution in a high dimensional optimization problem. The performance of reseed operation 210 causes method 200 to be a modified evolutionary process. Reseed operation 210 prevents or reduces the chance of identifying a local optimal solution rather than a global optimal solution.

Reseed operation 210 is performed after a specified quantity of iterations are performed, as determined at decision 206. Reseed operation 210 comprises retaining a data point at a first place of a first population of data points, and replacing all other data points of the first population of data points prior to continued iterations, wherein the first population of data points is a collection of a plurality of all data points and each data point comprises the specified quantity of Euler angles. In some illustrative examples, the quantity of iterations can be fifty iterations. In some illustrative examples, the quantity of iterations can be one hundred iterations. In some illustrative examples, the quantity of iterations can be adjusted by a user in a user interface.

In some illustrative examples, performing the reseed operation 210 comprises first generating a third plurality of data points to form a third population of data points and randomly generating a plurality of Euler angles for each data point of third population of data points within given bounds, the third population of data points comprising a one less data point than a first quantity of data points in the first population of data points; and replacing all data points of the first population of data points except the data point at the first place of the first population of data points by the third plurality of data points of the third population of data points. In some illustrative examples, the data point at the first place of the first population is referred to as a "selected reseed data point".

After identifying the data point in the first place of the first population of data points in reseed operation 210, method 200 returns to modified differential evolution process 204. The selected reseed data point is provided in initialization 214 and the remaining data points of the first population of data points are replaced with the data points of the third population of data points. Mutation 216, crossover 218, and selection 220 are performed iteratively on the new first population of data points in modified differential evolution process 204.

Modified differential evolution process 204, specified quantity of iterations in decision 206, iteration termination criterion in decision 208, and reseed operation 210 are repeatedly performed until both specified quantity of iterations and the iteration termination criterion are met. In response to determining that the specified quantity of iterations and the iteration termination criterion are both met, method 200 generates output data 212 based on a current first population of data points. In some illustrative examples, the output data comprises a plurality of Euler angles.

Turning now to FIG. 3, an illustration of a block diagram of a testing environment is depicted in accordance with an illustrative embodiment. Testing environment 300 can be used to test materials for aircraft 100 of FIG. 1. Method 200 of FIG. 2 can be implemented within testing environment 300. The optimization aspects depicted in illustration 400, view 500, view 600, view 700, view 800, and view 900 FIGS. 4-9 can be implemented within testing environment 300 of FIG. 3.

Material sample 302 can have physical testing performed by material testing system 304. Material testing system 304 takes any desirable form. In some illustrative examples, material testing system 304 takes the form of a diffraction system. In some illustrative examples, material testing system 304 takes the form of one of electron backscatter diffraction 306 or x-ray diffraction 307. Material test data 308 is generated by performing physical testing on material sample 302 by material testing system 304. In some illustrative examples, material test data 308 comprises at least one pole figures 310.

Computer system 312 is present in testing environment 300. Computer system 312 can be used to execute instructions 314 to perform modified differential evolution process 316. Modified differential evolution process 316 is configured to seek an optimal solution for a high-dimensional optimization problem. Modified differential evolution process 316 reduces the chance of the solution becoming trapped in a local optimum due to the introduction of the reseeding process.

Computer system 312 is configured to perform modified differential evolution process 316. Modified differential evolution process 316 can be implemented as operations 204 through 212 of FIG. 2. Computer system 312 comprises storage device 320 that stores program instructions 314, and number of processors 318 operably connected to storage device 320 and configured to execute program instructions 314 to cause computer system 312 to perform modified differential evolution process 316.

Number of processors 318 is operably connected to storage device 320 and configured to execute program instructions 314 to generate first population of data points 334, each data point of first population of data points 334 comprising specified quantity of Euler angles 376. Data point generator instructions 332 are executed to set first population of data points 334.

Number of processors 318 is operably connected to storage device 320 and configured to execute program instructions 314 to iteratively perform mutation, crossover, and data selection steps on first population of data points 334. For example, number of processors 318 is configured to execute mutation instructions 336 to perform a mutation step on first population of data points 334 to generate second population of data points 349. As another example, number of processors 318 is configured to execute crossover instructions 338 to perform a crossover step on first population of data points 334 to generate second population of data points 349. Number of processors 318 is configured to execute data selection instructions 340 to perform a data selection step on first population of data points 334 and second population of data points 349.

Number of processors 318 is operably connected to storage device 320 and configured to execute program instructions 314 to first determine if the current iteration number exceeds specified quantity of iterations 324 and if this condition is satisfied, further determine if iteration termination criterion 325 is not satisfied. If both of these conditions are met then number of processors 318 executes program instructions 314 to perform a reseed operation to replace all data points of first population of data points 334 other than the data point in first place 346. In some illustrative examples, the data point in first place 346 of first population of data points 334 may be referred to as a reseed data point. In some illustrative examples, the data point at first place 346 of first population of data points 334 is the data point within first population of data points 334 that best fits material test data 308. Number of processors 318 is operably connected to storage device 320 and configured to execute program instructions 314 to, in response to determining iteration termination criterion 325 is not satisfied after specified quantity of iterations 324, performing the reseed operation in which the first place of the first population of data points is retained and all other data points in the first population of data points are replaced.

Number of processors 318 is operably connected to storage device 320 and configured to execute program instructions 314 to iteratively perform mutation, crossover, and data selection steps on first population of data points 334 after periodically performing the reseed operation. Mutation instructions 336 include a formula or other function to perform a mutation step on first population of data points 334 by modifying each selected data point from a first population of data points by adding a fraction of differences of two of the other randomly selected data points from the first population of data points to form a portion of the second population of data points 349. In other illustrative examples, other mutation methods can be utilized.

Crossover instructions 338 include a formula or other function to perform a crossover step. The crossover step is a genetic operator used to decide whether the current data point will mutate or remain the same to the next generation.

Data selection instructions 340 are provided to replace respective data points in the first population of data points 334 by respective data points of the second population of data points 349 having smaller respective second error values 372 than respective first error values 368 associated with the respective data points in the first population of data points.

Iterator instructions 342 are performed to apply settings 322 to modified differential evolution process 316. The settings 322 include specified quantity of iterations 324 and iteration termination criterion 325.

Instructions 314 further cause computer system 312 to, in response to determining that specified quantity of iterations 324 and iteration termination criterion 325 are both met, generate output data 350 based on a current population of data points. In some illustrative examples, program instructions 314 further cause computer system 312 to display, in user interface 378, pole figures 310 generated from material test data 308 of a material sample 302 from a diffraction process 305 and display, in user interface 378, estimated pole figures 358 generated from output data 350.

Modified differential evolution process 316 provides an improved evolutionary algorithm that enables better handling of high dimensional problems. Modified differential evolution process 316 can be used to estimate a plurality of Euler angles 352 having crystallographic texture 354 of material sample 302 of alloy 301 for performing material analysis 360.

Three parameters are used to describe the orientation of a single crystal. Each parameter is called an Euler angle. A pole figure is a specified projection of the orientation of crystals generally defined by a distribution of Euler angles onto a flat disc. In some illustrative examples, pole figures 310 are a set of stereographic or equal area projections of distributions of crystal Euler angles 330 with respect to a specific crystal slip plane. Pole figures 310 can be generated from material test data 308 from a physical diffraction test. Pole figures 310 can be provided to modified differential evolution process 316 as input. Modified differential evolution process 316 is performed until a specified quantity of iterations 324 is met and iteration termination criterion 325 is satisfied. Plurality of Euler angles 352 is generated by modified differential evolution process 316. Plurality of Euler angles 352 can be used to form estimated pole figures 358 that will substantially resemble pole figures 310 when specified quantity of iterations 324 is met and iteration termination criterion 325 is satisfied.

By performing modified differential evolution process 316, sufficient input is generated for material analysis 360. In some illustrative examples, modified differential evolution process 316 generates output data 350 as inputs for material analysis 360.

Output data 350 generated by output generator 348 of modified differential evolution process 316 is used as input for advanced crystal-scale material model (ACSMM) 362. ACSMM 362 is used to model high fidelity material analysis 360 with substantially less cost and less waste than physically performing material testing. Material analysis 360 can be used to save at least one of time or resources instead of performing physical material testing.

In some illustrative examples, computer system 312 is configured to model the mechanical behaviors of material sample 302 of alloy 301 based on output data 350 subjected to a set of specified strain paths. In some illustrative examples, computer system 312 is configured to design a new alloy satisfying a number of design requirements based on the modeling mechanical behaviors of material sample 302 of alloy 301 subjected to a set of specified strain paths.

Number of processors 318 is configured to execute program instructions 314 to cause computer system 312 to perform modified differential evolution process 316 comprising a reseed operation using pole figures 310 from the diffraction process 305 as input, wherein modified differential evolution process 316 comprises the generating first population of data points 334, the iteratively performing the mutation, crossover, and data selection, and performing the reseed.

Output data 350 can be provided to perform material analysis 360 of material sample 302. Material analysis 360 can take any desirable form. In some illustrative examples, material analysis 360 takes the form of advanced crystal-scale material model (ACSMM) 362.

Modified differential evolution process 316 can be used to find plurality of Euler angles 352 indicating orientations 328 of specified quantity of crystals 326 in order to approximate crystallographic texture 354 for alloy 301. In some illustrative examples, the quantity of Euler angles used to describe a crystallographic texture will be three per crystal which gives 3n Euler angles for a specified quantity of crystals 326, n. For large numbers of n, for example n=100, this comprises a high dimensional optimisation problem. To tackle this high dimensional optimization problem, modified differential evolution process 316 comprises a reseed operation. Reseed instruction 344 increases the chance of finding the optimal solution for estimating crystallographic texture 354 of alloy 301.

Reseed instructions 344 direct computer system 312 to generate a third plurality of data points to form third population of data points 345. In some illustrative examples, the third plurality of data points is generated to form third population of data points 345 by randomly generating a plurality of Euler angles for each data point of third population of data points 345 within given bounds. In some illustrative examples, third population of data points 345 comprises a one less data point than a first quantity of data points in the first population of data points 334. Quantity of data points 347 is one less than a first quantity of data points in first population of data points 334.

Reseed instructions 344 direct computer system 312 to replace all data points of first population of data points 334 except the data point at first place 346 of first population of data points 334 by the third plurality of data points of the third population of data points 345.

Plurality of Euler angles 352 as the output data 350 of modified differential evolution process 316 can be used as the input for material analysis 360 such as advanced crystal-scale material model (ACSMM) 362. The applications of material analysis 360 can include microstructural simulation, material characterization, and/or prediction of mechanical properties. Material analysis 360 can also be used for applications such as alloy development and design, process design for forming operations (e.g. to improve part quality), calibration of mechanical models used for simulation and structural optimization.

In some illustrative examples, alloy 301 is one of a plurality of alloys with corresponding material samples. Each of the plurality of alloys can be subjected to one or more diffraction experiments yielding respective material test data. The respective material test data may then be used to generate output data for each alloy of the plurality of alloys. The mechanical behavior of one or more alloys of the plurality of alloys when subjected to a plurality of strain paths is predicted using the respective output data. In some illustrative examples, a preferred alloy may then be selected based on the respective predicted mechanical behavior.

In some illustrative examples, a plurality of alloys with corresponding material samples can be subjected to one or more diffraction experiments yielding respective material test data. The respective Material test data may then be used to generate output data for each alloy of the plurality of alloys. Output data may then be used as the input for part analysis 364. For example, Euler angles 352 can be used as input to perform part analysis 364 on a design of a part. A design of a part can be modified based on part analysis 364. A design of fabricated object 366 can be influenced by material analysis 360 and part analysis 364.

A system for performing a modified differential evolution process to estimate crystallographic texture of an alloy comprising: a storage device 320 that stores program instructions 314; a number of processors 318 operably connected to storage device 320 and configured to execute program instructions 314 to cause computer system 312 to receive material test data 308 of a material sample 302 of alloy 301 and perform modified differential evolution process 316 including a reseed operation to estimate plurality of Euler angles 352 indicating orientations 328 of specified quantity of crystals 326 approximating the respective spatial distributions of pole figure intensity values 371 based on bitmap values of pole figures 310 associated with material test data 308. The reseed operation comprises retaining a data point at first place 346 of first population of data points 334 and replacing all other data points of first population of data points 334 prior to continued iterations.

Program instructions 314 further cause computer system 312 to, in response to determining that iteration termination criterion 325 is met, generate output data 350 based on current first population of data points 334. In some illustrative examples, program instructions 314 further cause computer system 312 to display, in a user interface 378, pole figures 310 generated from material test data 308 of material sample 302 from diffraction process 305 and display, in user interface 378, estimated pole figures 358 generated from output data 350.

Program instructions 314 cause computer system 312 to perform modified differential evolution process 316 to cause the system to iteratively perform mutation, crossover, and data selection steps on first population of data points 334 for specified quantity of iterations 324. The data selection step comprises moving a data point in first population of data points 334 having a smallest error to first place 346 of first population of data points 334 after performing mutation and crossover steps. In response to determining iteration termination criterion 325 is not satisfied after specified quantity of iterations 324, performing the reseed operation in which first place 346 of first population of data points 334 is retained and all other data points in first population of data points 334 are replaced.

In some illustrative examples, the mutation, crossover, and data selection steps comprise determining first error values 368 indicative of how closely spatial distributions of pole figure intensity values 370 generated by using the Euler angles contained in each data point in first population of data points 334 represent respective spatial distributions of pole figure intensity values 371 based on bitmap values of pole figures 310 associated with material test data 308.

In some illustrative examples, the mutation, crossover, and data selection steps comprise generating a second plurality of data points to form a second population of data points 349. In some illustrative examples, the mutation, crossover, and data selection steps comprise determining second error values 372 indicative of how closely spatial distributions of pole figure intensity values 374 generated using spatial distributions of pole figure intensity values 374 of Euler angles contained in each data point in second population of data points 349 represent respective spatial distributions of pole figure intensity values 371 generated using material test data 308. In some illustrative examples, the mutation, crossover, and data selection steps comprise determining second error values 372 indicative of how closely spatial distributions of pole figure intensity values 374 generated by using the Euler angles contained in each data point in second population of data points 349 represent respective spatial distributions of pole figure intensity values 371 based on bitmap values of pole figures 310 associated with material test data 308. In some illustrative examples, the mutation, crossover, and data selection steps comprise replacing respective data points in first population of data points 334 by respective data points of second population of data points 349 having smaller respective second error values 372 than respective first error values 368 associated with the respective data points in first population of data points 334.

In some illustrative examples, distributions are generated for each data point in first population of data points 334 to form a first set of spatial distributions of pole figure intensity values 370. Spatial distributions of pole figure intensity values 370 are a plurality of two-dimensional graphical representations associated with a plurality of respective pole figures of a respective data point. Determining the first error values 368 for each data point of first population of data points 334 comprises comparing a plurality of spatial distributions of pole figure intensity values 370 to a plurality of spatial distributions of pole figure intensity values 371 based on bitmap values of pole figures 310 associated with material test data 308.

Each data point of first population of data points 334 comprises specified quantity of Euler angles 376. Computer system 312 receives specified quantity of crystals 326 for modified differential evolution process 316. In some illustrative examples, specified quantity of Euler angles 376 is set equal to three times specified quantity of crystals 326.

Generating the second population of data points 349 comprises selecting a percentage of data points randomly drawn from first population of data points 334. Generating the second population of data points 349 comprises modifying each selected data point by adding a fraction of differences of two other randomly selected data points from first population of data points 334 to form a portion of the second population of data points 349. Generating the second population of data points 349 comprises adding remaining data points from first population of data points 334 to the second population of data points 349.

The illustration of testing environment 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
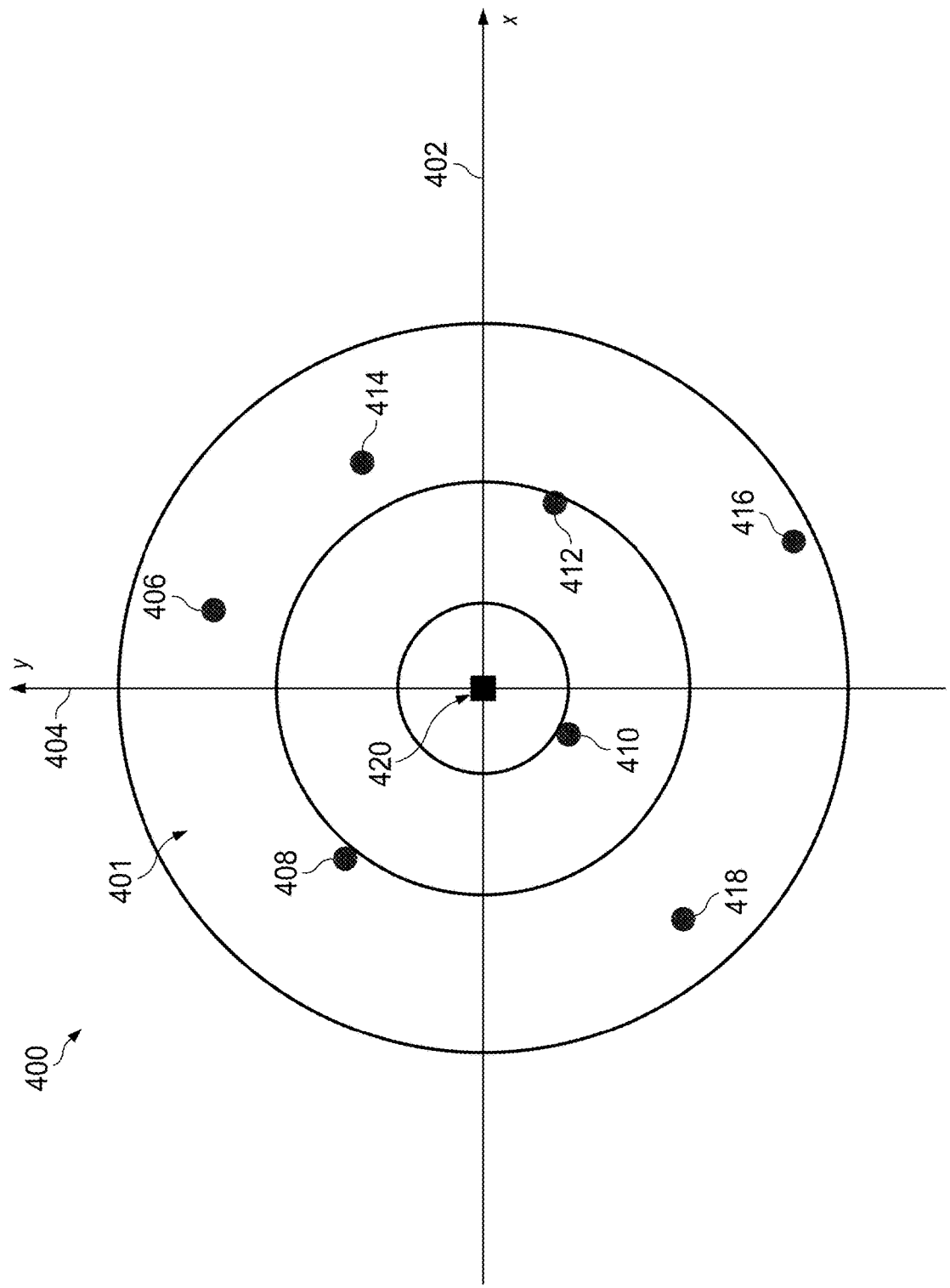
FIG. 4 is an illustration of an initialization aspect of a modified differential evolution process in accordance with an illustrative embodiment.

Turning now to FIG. 4, an illustration of an initialization aspect of a modified differential evolution process is depicted in accordance with an illustrative embodiment. Illustration 400 provides a simplified illustration of an initialization step for a modified differential evolution process, such as initialization 214 of FIG. 2. First population of data points 401 is depicted within illustration 400.

In this illustrative example, illustration 400 has x-axis 402 and y-axis 404 with first population of data points 401 comprising only seven points include point 406, point 408, point 410, point 412, point 414, point 416, and point 418, however, for the actual applications of estimating crystallographic texture, the first population of data points comprises the specified quantity of data points and each data point in a first population of data points comprises the specified quantity of Euler angles. Illustration 400 is only a simplified illustration provided for ease of explanation.

Point 406 is positioned at x1, y1. Point 408 is positioned at x2, y2. Point 410 is positioned at x3, y3. Point 412 is positioned at x4, y4. Point 414 is positioned at x5, y5. Point 416 is positioned at x6, y6. Point 418 is positioned at x7, y7. Global minimum 420 is also visible in illustration 400.

To perform the initialization, a specified quantity of data points are randomly generated. In the following description, certain values are described as being generated, selected, or determined randomly. The term "randomly" and related terms that use "random" as a stem (e.g., randomize, etc.) are used herein to indicate values are determined using a generally stochastic operation. Such operations can include, for example, pseudo-random operations such as those that are generally performed by "random-number generators" used by many computing devices.

In this initialization, a plurality of data points is generated to form first population of data points 401. In some illustrative examples, the data points are designated or determined by randomly selecting points from a specified range of an N-dimensional feature space, where N is equal to three times the set quantity of crystals.

Figure 5:
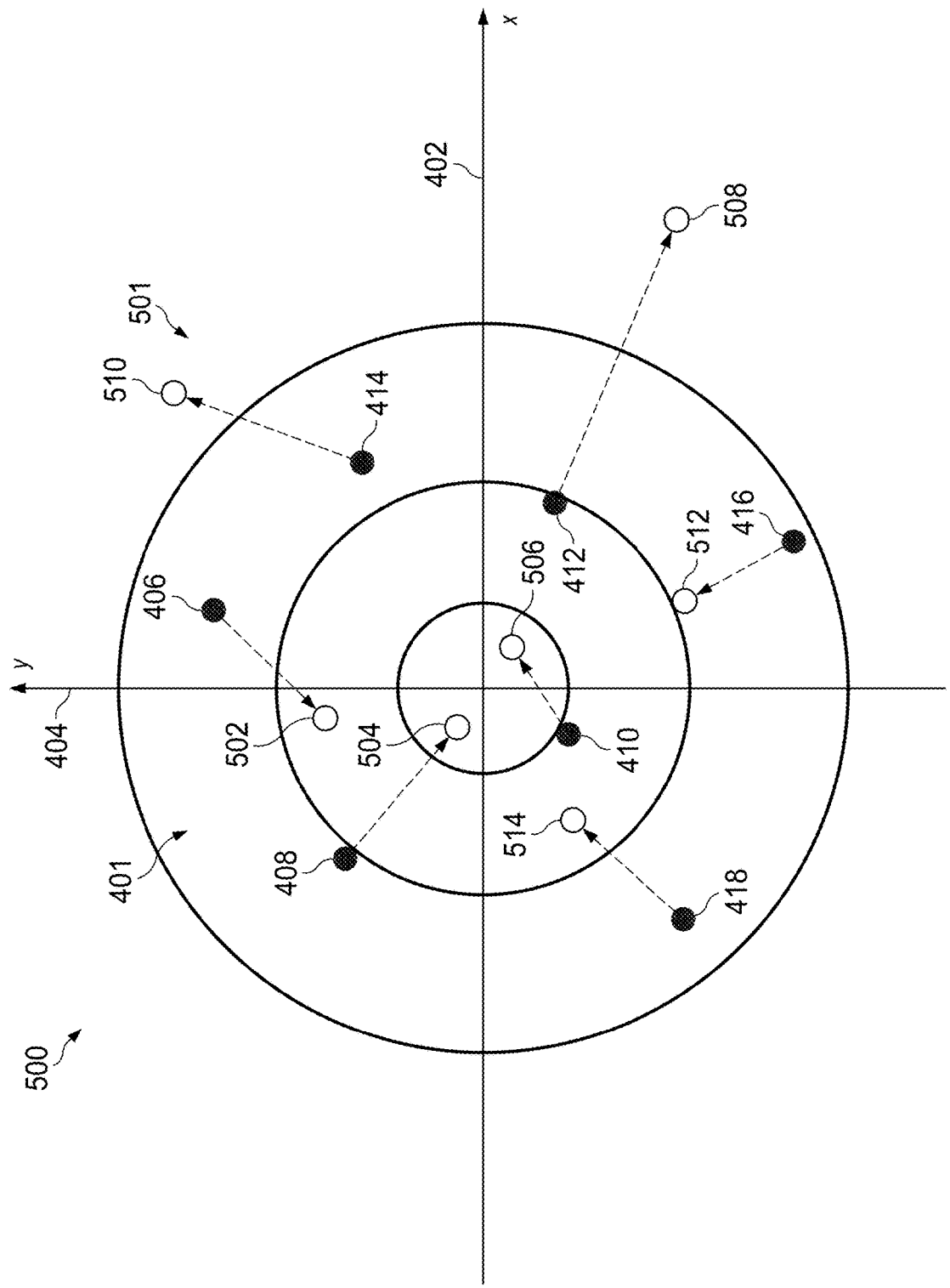
FIG. 5 is an illustration of a mutation aspect of a modified differential evolution process in accordance with an illustrative embodiment.

Turning now to FIG. 5, an illustration of a mutation aspect of a modified differential evolution process is depicted in accordance with an illustrative embodiment. View 500 provides a simplified illustration of a mutation step for a modified differential evolution process, such as mutation 216 of FIG. 2. Mutation in these illustrative examples refers to modifying the data set in a manner that is structured, random within defined parameters, or structured with some random aspects. By modifying the data set, one or more data points within the data set are changed.

View 500 is a view of second population 501 and first population of data points 401. Each point of first population of data points 401 has a corresponding point in second population 501. Point 406 has corresponding point 502 of second population 501. Point 408 has corresponding point 504 of second population 501. Point 410 has corresponding point 506 of second population 501. Point 412 has corresponding point 508 of second population 501. Point 414 has corresponding point 510 of second population 501. Point 416 has corresponding point 512 of second population 501. Point 418 has corresponding point 514 of second population 501.

In this illustrative example, a data point from first population of data points 401 has been randomly picked and then its position is changed by using the differences of two other selected data points from first population of data points 401. In this illustrative example, the mutation is performed using New x1=x2+F×(x7−x6) and New y1=y2+F×(y7−y6); where F is a mutation parameter which is a scalar value randomly drawn between zero and one. Mutation parameter F is regenerated every time when calculating the differences of any set of two data points. In other illustrative examples, other mutation methods can be utilized.

Figure 6:
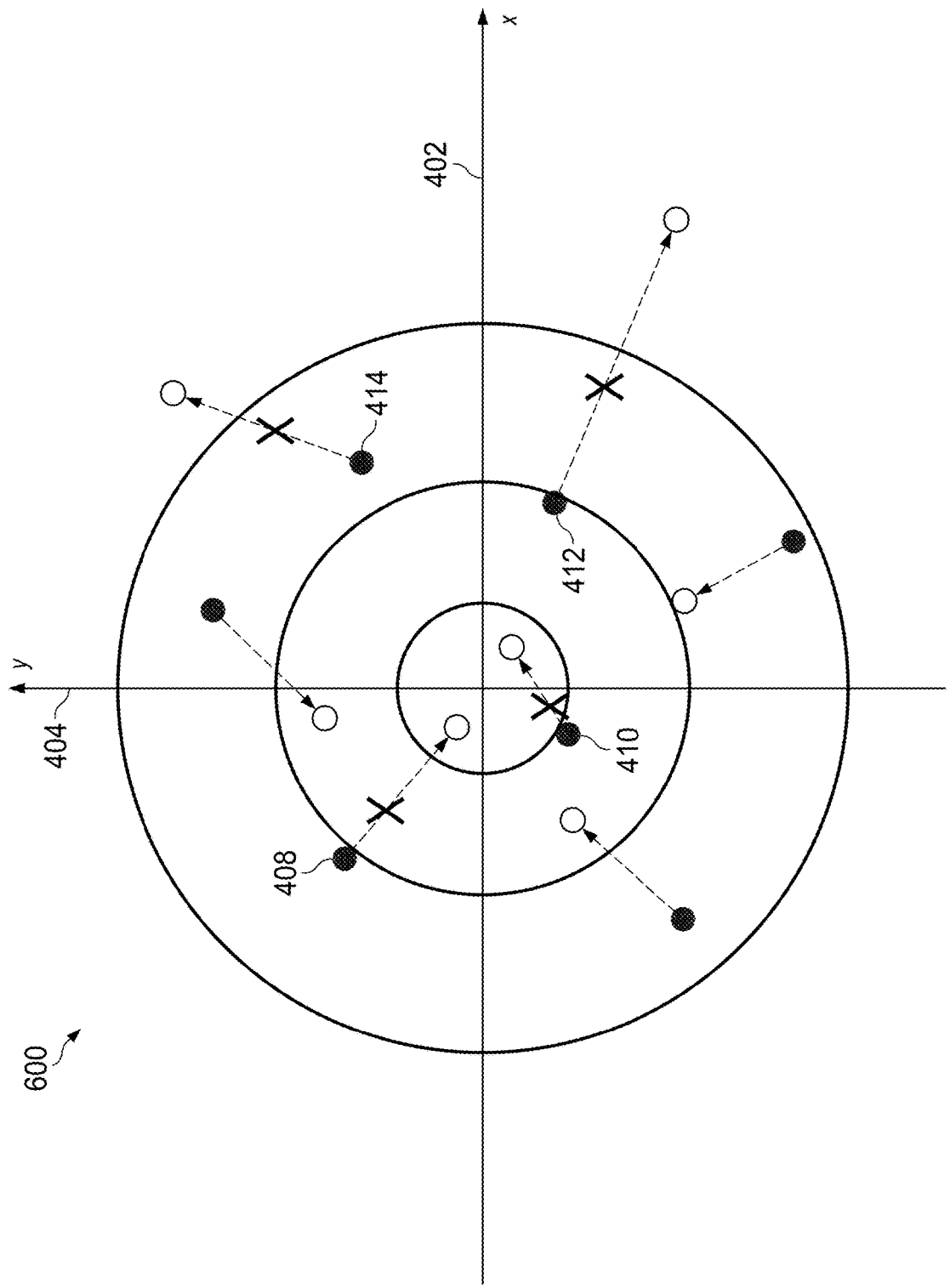
FIG. 6 is an illustration of a crossover aspect of a modified differential evolution process in accordance with an illustrative embodiment.

Turning now to FIG. 6, an illustration of a crossover aspect of a modified differential evolution process is depicted in accordance with an illustrative embodiment. View 600 provides a simplified illustration of a crossover step for a modified differential evolution process, such as crossover 218 of FIG. 2.

In view 600, point 408, point 410, point 412, and point 414 are the picked population. As a result, point 408, point 410, point 412, and point 414 will be used in the next iteration.

Crossover can also be called reproduction. In the illustrative examples, crossover is a genetic operator used to decide whether the current data point will evolute (mutate) to the next generation. To perform crossover, a crossover value (CR) is assigned and randomly picks one data point. Then, if CR is greater than a scaler value randomly drawn between zero and one, the picked data point is updated by mutation, otherwise the original data point is retained.

Figure 7:
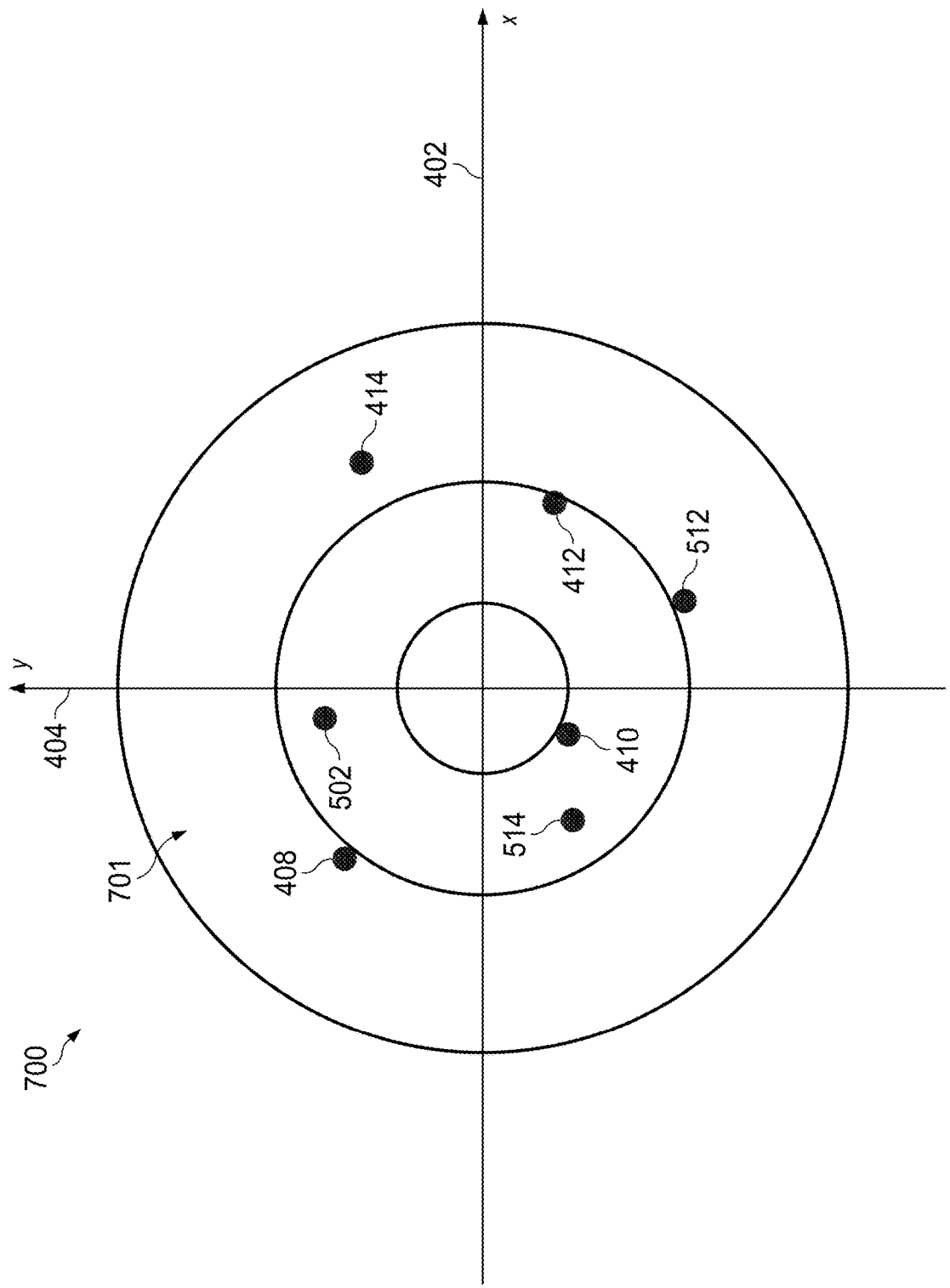
FIG. 7 is an illustration of a selection aspect of a modified differential evolution process in accordance with an illustrative embodiment.

Turning now to FIG. 7, an illustration of a selection aspect of a modified differential evolution process is depicted in accordance with an illustrative embodiment. View 700 provides a simplified illustration of a selection step for a modified differential evolution process, such as selection 220 of FIG. 2.

Selection in the context of evolutionary processes refers to determining which of two or more data points is to be included in a subsequent population, for example the next population of data points. The selection can be structured (e.g., a data point with a smallest error value is selected), random, or structured with random aspects (e.g., error values of data points are randomly weighted before selection based on the error values). In some illustrative examples, the error values can be calculated using flowchart 1300 shown in FIG. 13. In some illustrative examples, the error values are calculated from distributions generated from a plurality of Euler angles of the data points in the first population of data points.

In view 700, point 502 of second population, point 408, point 410, point 412, point 414, point 512 of second population, and point 514 of second population are present. If a specified quantity of iterations has not yet been satisfied, an evolutionary search process can be iteratively performed on selected points 701. Selected points 701 now make up the first population of data points. The current best data point, point 410, which has the smallest objective value is moved to the first place of the first population of data points 701. If a specified quantity of iterations has not yet been satisfied, selected points 701 can be reintroduced to a mutation step, such as mutation 216.

In some illustrative examples, the data points are chosen based on "survival of the fittest" principle. In some illustrative examples, the data point is updated only if $f(x_{new}, y_{new}) < f(x_{old}, y_{old})$, wherein $f( )$ is the objective function to be minimized and $x_{new}, y_{new}$ is the position of a proposed new point after performing the mutation and crossover steps on the respective old point at position $x_{old}, y_{old}$.

Figure 8:
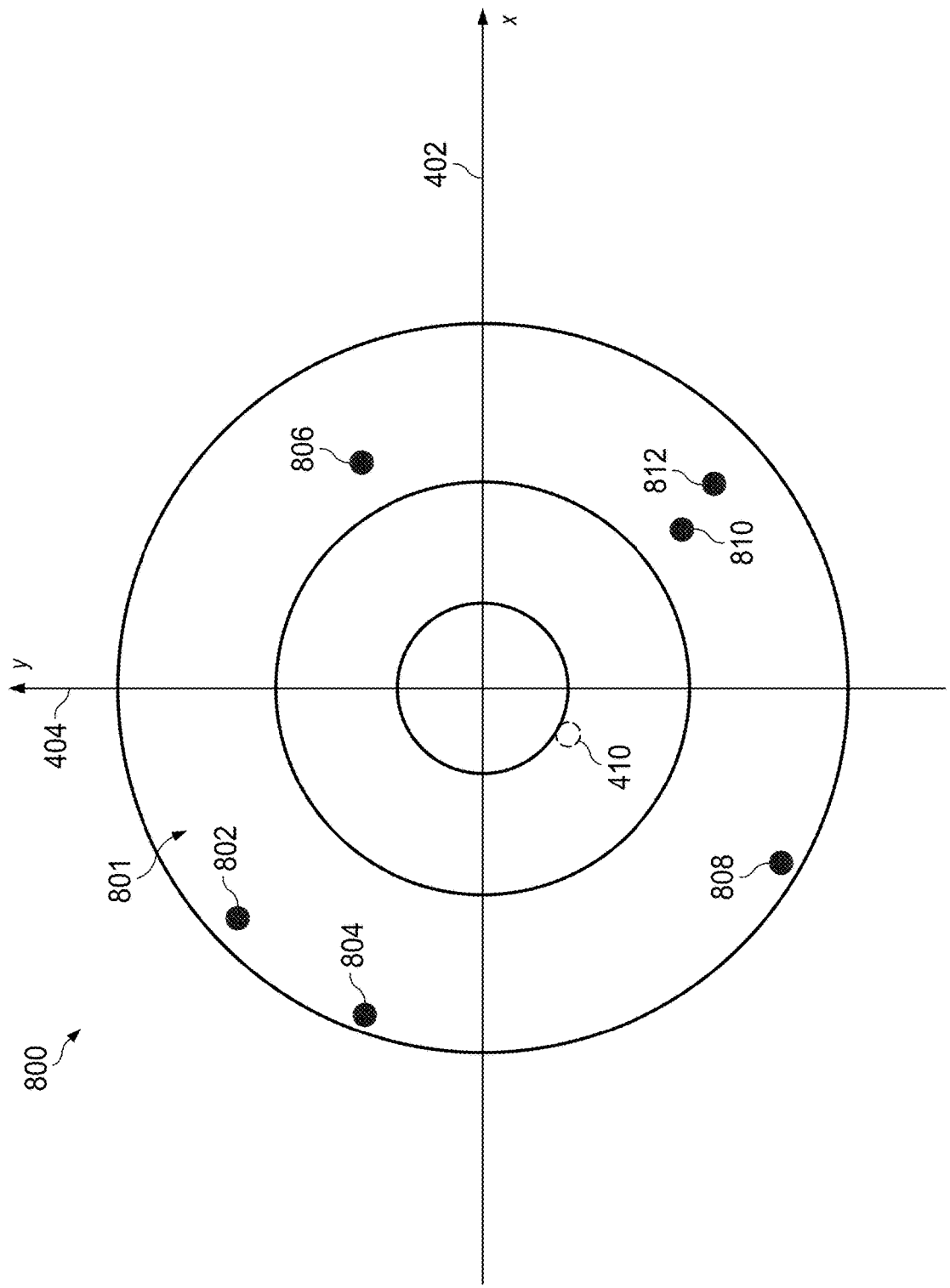
FIG. 8 is an illustration of a reseed aspect of a modified differential evolution process in accordance with an illustrative embodiment.

Turning now to FIG. 8, an illustration of a reseed aspect of a modified differential evolution process is depicted in accordance with an illustrative embodiment. View 800 provides a simplified illustration of a reseed operation for a modified differential evolution process, such as performing reseed operation 210 of FIG. 2.

In view 800, population of data points 801 includes point 410, which can be referred to as a first point or best point. Point 410 is the current best data point. Point 410 can also be referred to as a data point in first place 346 of FIG. 3. Point 410 can be referred to as a selected reseed point. The remainder of population of data points 801 are randomly generated data points within given bounds. Population of data points 801 include data point 802, data point 804, data point 806, data point 808, data point 810, and data point 812. Generating population of data points 801 can be considered as another initialization step but with point 410 as a portion of population of data points 801.

The method will reseed or resample all data points except the current best data point, i.e. the first data point. In some illustrative examples, the current best data point is positioned at $x_{cb}, y_{cb}$ which gives the minimum objective value, i.e. $f(x_{cb}, y_{cb}) <= f(x_i, y_i)$ after some set quantity of iterations, wherein $x_i, y_i$ are the positions for all data points of the current populations of data points. In some illustrative examples, the quantity of iterations can be fifty iterations. In some illustrative examples, the quantity of iterations can be one hundred iterations. In some illustrative examples, the quantity of iterations can be adjusted by a user in a user interface.

Figure 9:
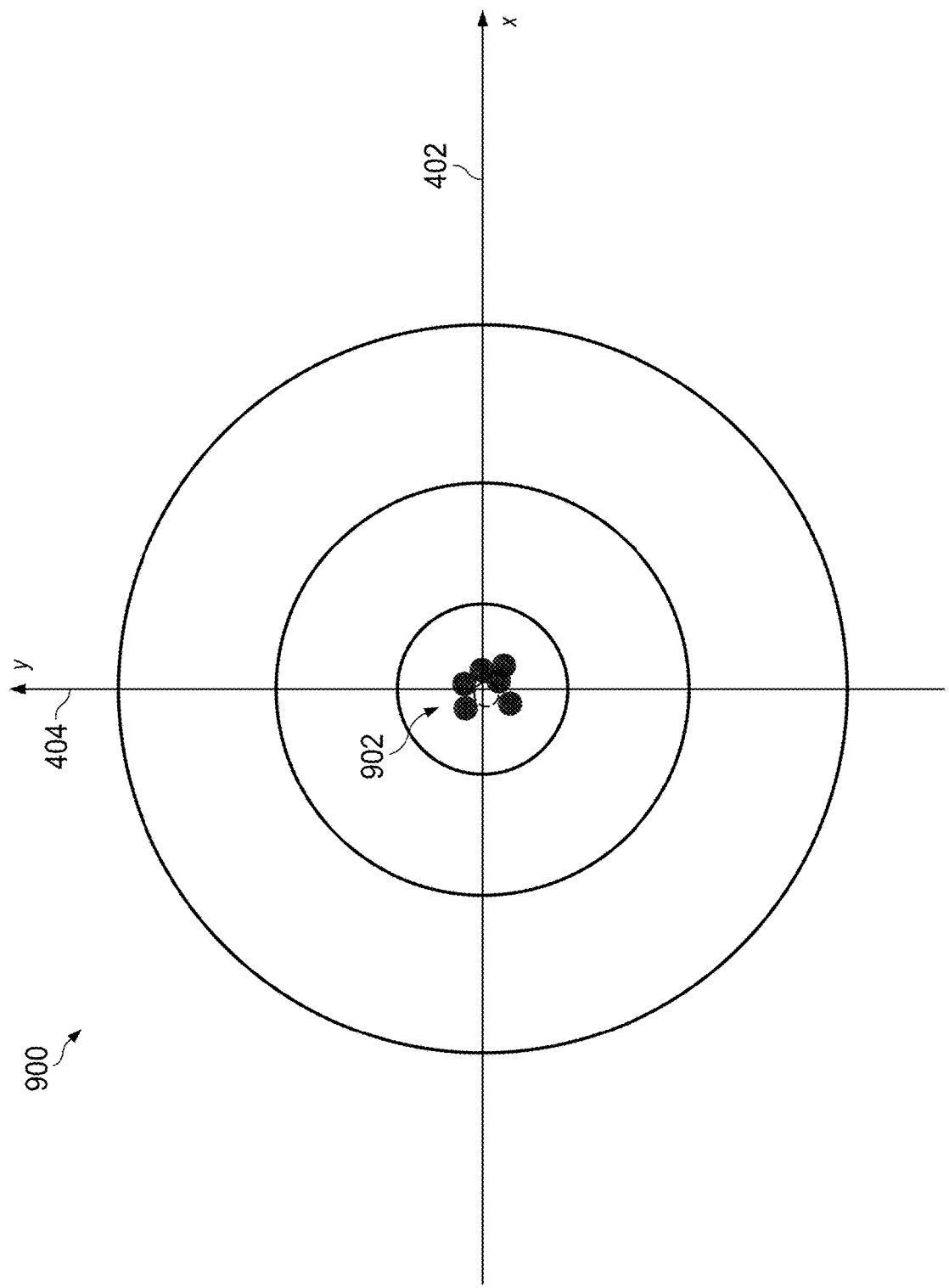
FIG. 9 is an illustration of the data points after iterations have been completed and the iteration termination criterion has been met of a modified differential evolution process in accordance with an illustrative embodiment.

Turning now to FIG. 9, an illustration of the data points after iterations have been completed and the iteration termination criterion has been met of a modified differential evolution process is depicted in accordance with an illustrative embodiment. View 900 is a view of population of data points 902 that contains the first data point 902, having the minimum objective value. More specifically, by performing iterative processes with periodic reseeding, the modified differential evolution process will output the current first data point 902 which gives the minimum objective value for all current and previous populations of data points when method 200 has met specified quantity of iterations in decision 206 and iteration termination criterion in decision 208 of FIG. 2.

FIGS. 4-9 are provided as simplified illustrations of initialization, mutation, crossover, selection, and reseeding. FIGS. 4-9 are provided for illustrating the implementation and advantage of reseeding. FIGS. 4-9 are not meant to imply physical or architectural limitations to the manner in which an illustrative embodiment may be implemented. A modified evolutionary process can have any desirable optimization function, any desirable quantity of data points, and any desirable parameters in a function.

Figure 10A:
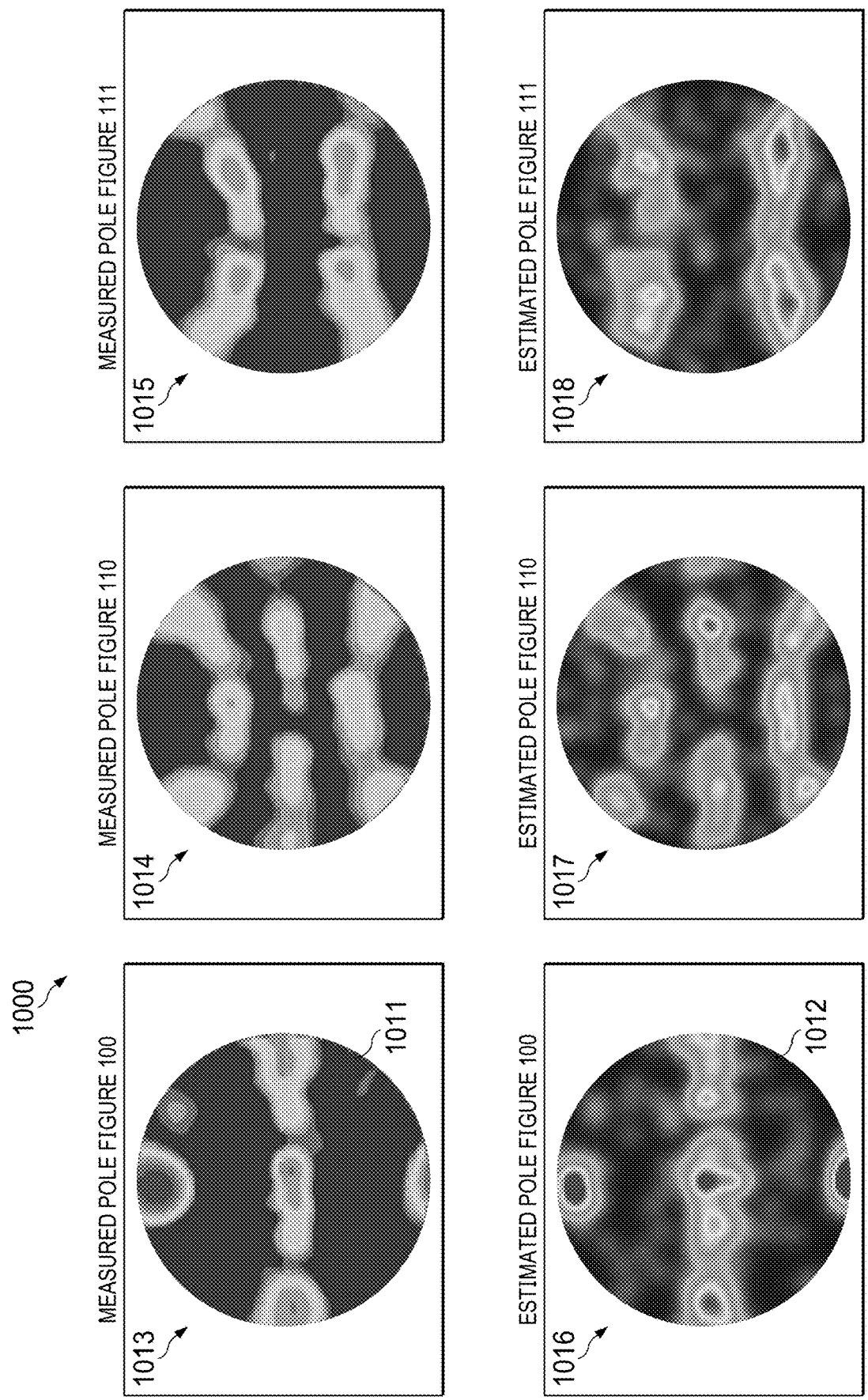
FIGS. 10A, 10B, and 10C are illustrations of pole figures displayed in a user interface in accordance with an illustrative embodiment.
Figure 10B:
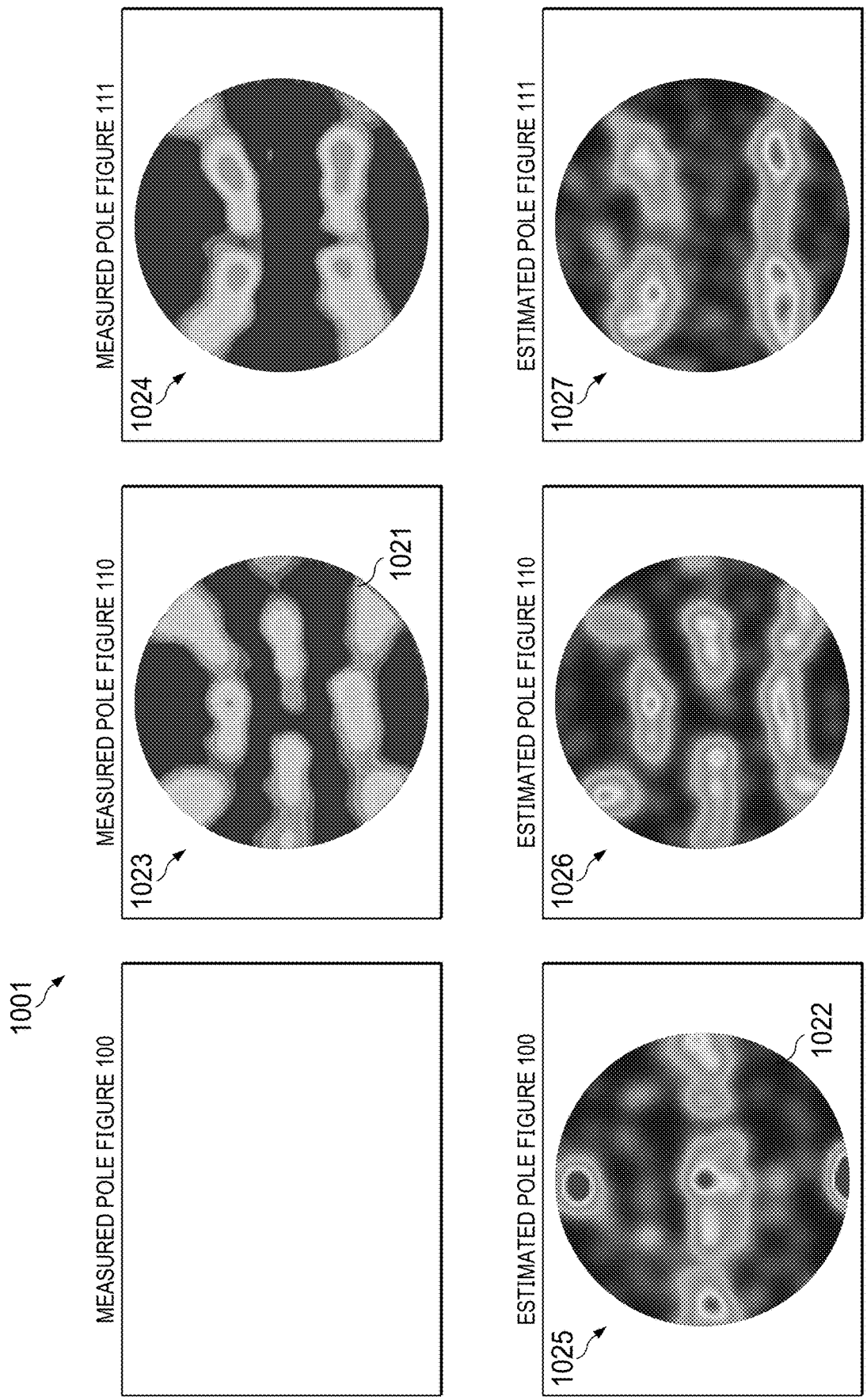
Figure 10C:
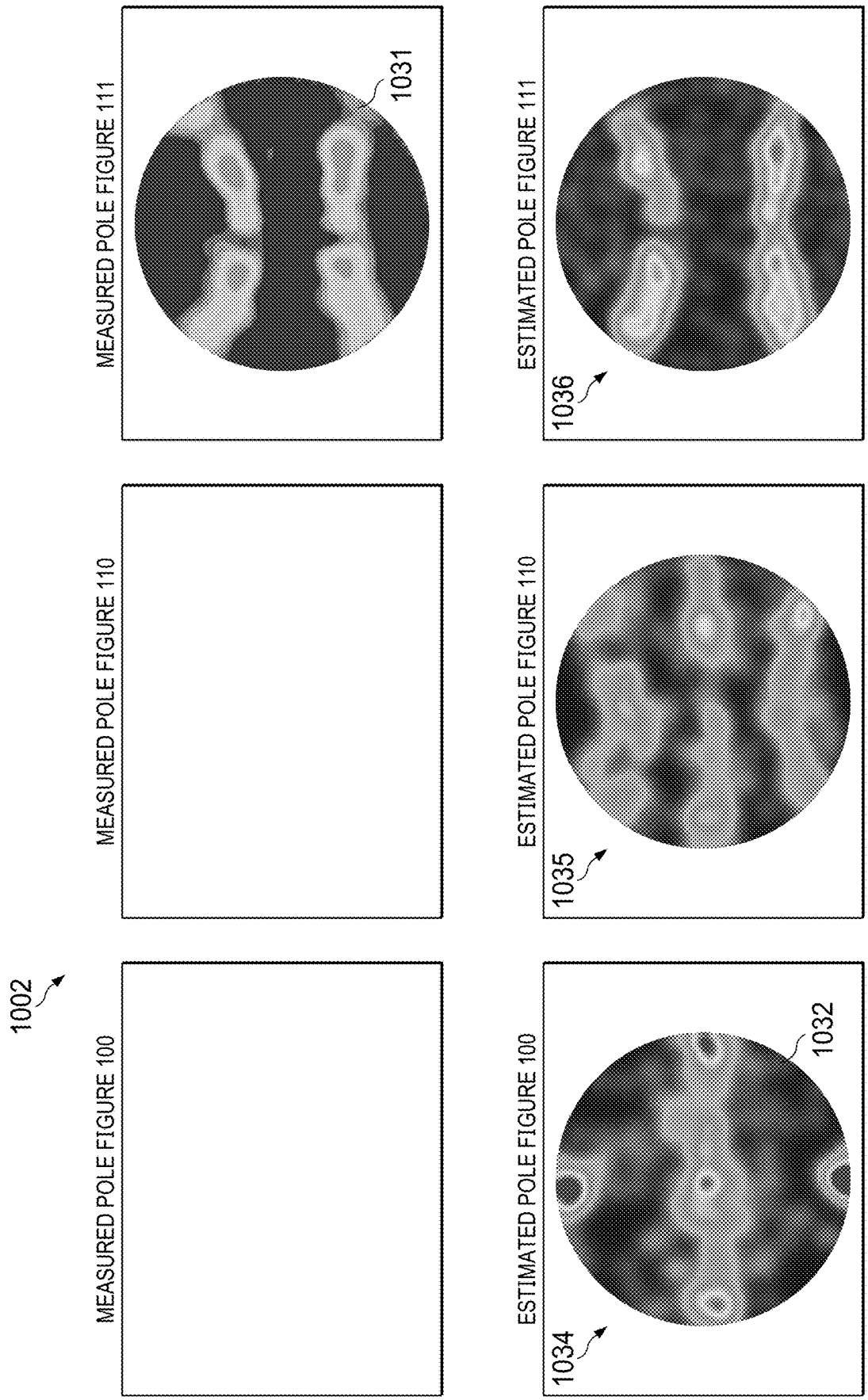

Turning now to FIGS. 10A, 10B, and 10C, illustrations of pole figures displayed in a user interface are depicted in accordance with an illustrative embodiment. Views 1000, 1001, and 1002 can each be a view within a user interface for testing material to be used in aircraft 100 of FIG. 1. Views 1000, 1001, and 1002 can each be a view of output data 212 generated in FIG. 2. Views 1000, 1001, and 1002 can each be a product generated from method 200 of FIG. 2. Views 1000, 1001, and 1002 each can include data generated by instructions 314 in computer system 312 of FIG. 3.

FIGS. 10A, 10B, and 10C include pole figures 1011, 1021 and 1031 generated from physical testing of a material, e.g. diffraction testing. Pole figures 1011, 1021 and 1031 can be an implementation of pole figures 310 of FIG. 3 generated from material test data 308 of FIG. 3.

FIGS. 10A, 10B, and 10C include pole figures 1012, 1022 and 1032 generated using a Gaussian Kernel Density Estimation of stereographic or equal area projections of a plurality of Euler angles optimized from a modified evolutionary process, such as modified differential evolution process 316 of FIG. 3. Pole figures 1012, 1022 and 1032 can be generated from output data 212 generated in FIG. 2. Pole figures 1012, 1022 and 1032 can be an implementation of estimated pole FIGS. 358 of FIG. 3 generated from output data 350 of FIG. 3.

Pole figures 1011 include measured pole figure with respect to the slip plane having the slip plane normal in [100] direction 1013, measured pole figure with respect to the slip plane having the slip plane normal in [110] direction 1014 and measured pole figure with respect to the slip plane having the slip plane normal in [111] direction 1015. Pole figures 1012 include estimated pole figure generated using a Gaussian Kernel Density Estimation of stereographic or equal area projection of a plurality of Euler angles optimized from a modified evolutionary process with respect to the slip plane having the slip plane normal in [100] direction 1016, estimated pole figure generated using a Gaussian Kernel Density Estimation of stereographic or equal area projection of a plurality of crystal Euler angles optimized from a modified evolutionary process with respect to the slip plane having the slip plane normal in [110] direction 1017 and estimated pole figure generated using a Gaussian Kernel Density Estimation of stereographic or equal area projection of a plurality of Euler angles optimized from a modified evolutionary process with respect to the slip plane having the slip plane normal in [111] direction 1018.

Pole figures 1021 include measured pole figure with respect to the slip plane having the slip plane normal in [110]

direction 1023 and measured pole figure with respect to the slip plane having the slip plane normal in [111] direction 1024. Pole figures 1022 include estimated pole figure generated using a Gaussian Kernel Density Estimation of stereographic or equal area projection of a plurality of crystal Euler angles optimized from a modified evolutionary process with respect to the slip plane having the slip plane normal in [100] direction 1025, estimated pole figure generated using a Gaussian Kernel Density Estimation of stereographic or equal area projection of a plurality of crystal Euler angles optimized from a modified evolutionary process with respect to the slip plane having the slip plane normal in [110] direction 1026 and estimated pole figure generated using a Gaussian Kernel Density Estimation of stereographic or equal area projection of a plurality of crystal Euler angles optimized from a modified evolutionary process with respect to the slip plane having the slip plane normal in [111] direction 1027.

Pole figures 1031 include measured pole figure with respect to the slip plane having the slip plane normal in [111] direction 1033. Pole figures 1032 include estimated pole figure generated from a Gaussian Kernel Density Estimation of stereographic or equal area projection of a plurality of crystal Euler angles optimized from a modified evolutionary process with respect to the slip plane having the slip plane normal in [100] direction 1034, estimated pole figure generated using a Gaussian Kernel Density Estimation of stereographic or equal area projection of a plurality of crystal Euler angles optimized from a modified evolutionary process with respect to the slip plane having the slip plane normal in [110] direction 1035 and estimated pole figure generated using a Gaussian Kernel Density Estimation of stereographic or equal area projection of a plurality of Euler angles optimized from a modified evolutionary process with respect to the slip plane having the slip plane normal in [111] direction 1036.

As can be seen in view 1000 in FIG. 10A, when supplying three measured pole figures as the input of modified differential evolution process 316 of FIG. 3, measured pole figure with respect to the slip plane having the slip plane normal in [100] direction 1013 and estimated pole figure with respect to the slip plane having the slip plane normal in [100] direction 1016 have substantially the same spatial distribution of pole figure intensity values; measured pole figure with respect to the slip plane having the slip plane normal in [110] direction 1014 and estimated pole figure with respect to the slip plane having the slip plane normal in [110] direction 1017 have substantially the same spatial distribution of pole figure intensity values; measured pole figure with respect to the slip plane having the slip plane normal in [111] direction 1015 and estimated pole figure with respect to the slip plane having the slip plane normal in [111] direction 1018 have substantially the same spatial distribution of pole figure intensity values.

As can be seen in view 1001 in FIG. 10B, when supplying two measured pole figures as the input of modified differential evolution process 316 of FIG. 3, measured pole figure with respect to the slip plane having the slip plane normal in [110] direction 1023 and estimated pole figure with respect to the slip plane having the slip plane normal in [110] direction 1026 have substantially the same spatial distribution of pole figure intensity values; measured pole figure with respect to the slip plane having the slip plane normal in [111] direction 1024 and estimated pole figure with respect to the slip plane having the slip plane normal in [111] direction 1027 have substantially the same spatial distribution of pole figure intensity values.

As can be seen in view 1002 in FIG. 10C, when supplying only one measured pole figures as the input of modified differential evolution process 316 of FIG. 3, measured pole figure with respect to the slip plane having the slip plane normal in [111] direction 1023 and estimated pole figure with respect to the slip plane having the slip plane normal in [111] direction 1036 have substantially the same spatial distribution of pole figure intensity values.

A modified evolutionary process including a number of reseeding steps has been utilized to solve for a sufficient quantity of parameters or Euler Angles to form estimated pole figure with respect to the slip plane having the slip plane normal in [100] direction 1016 that resembles measured pole figure with respect to the slip plane having the slip plane normal in [100] direction 1013; estimated pole figures with respect to the slip plane having the slip plane normal in [110] direction 1017 and 1026 that resembles measured pole figures with respect to the slip plane having the slip plane normal in [110] direction 1014 and 1023, respectively and estimated pole figures with respect to the slip plane having the slip plane normal in [111] direction 1018, 1027 and 1036 that resembles measured pole figures with respect to the slip plane having the slip plane normal in [111] direction 1015, 1024 and 1033, respectively.

Pole figures 1012, 1022 and 1032 can be used to visually confirm that the modified evolutionary process produced an output that estimates a specified quantity of crystal Euler angles which are able to approximate the crystallographic texture given by a diffraction inspection of the material. Pole figures 1012, 1022 and 1032 can be used to visually confirm that the modified differential evolution with reseeding process has adequately approximated the crystallographic texture given by a diffraction inspection of the material by a user utilizing the user interface.

Figure 11:
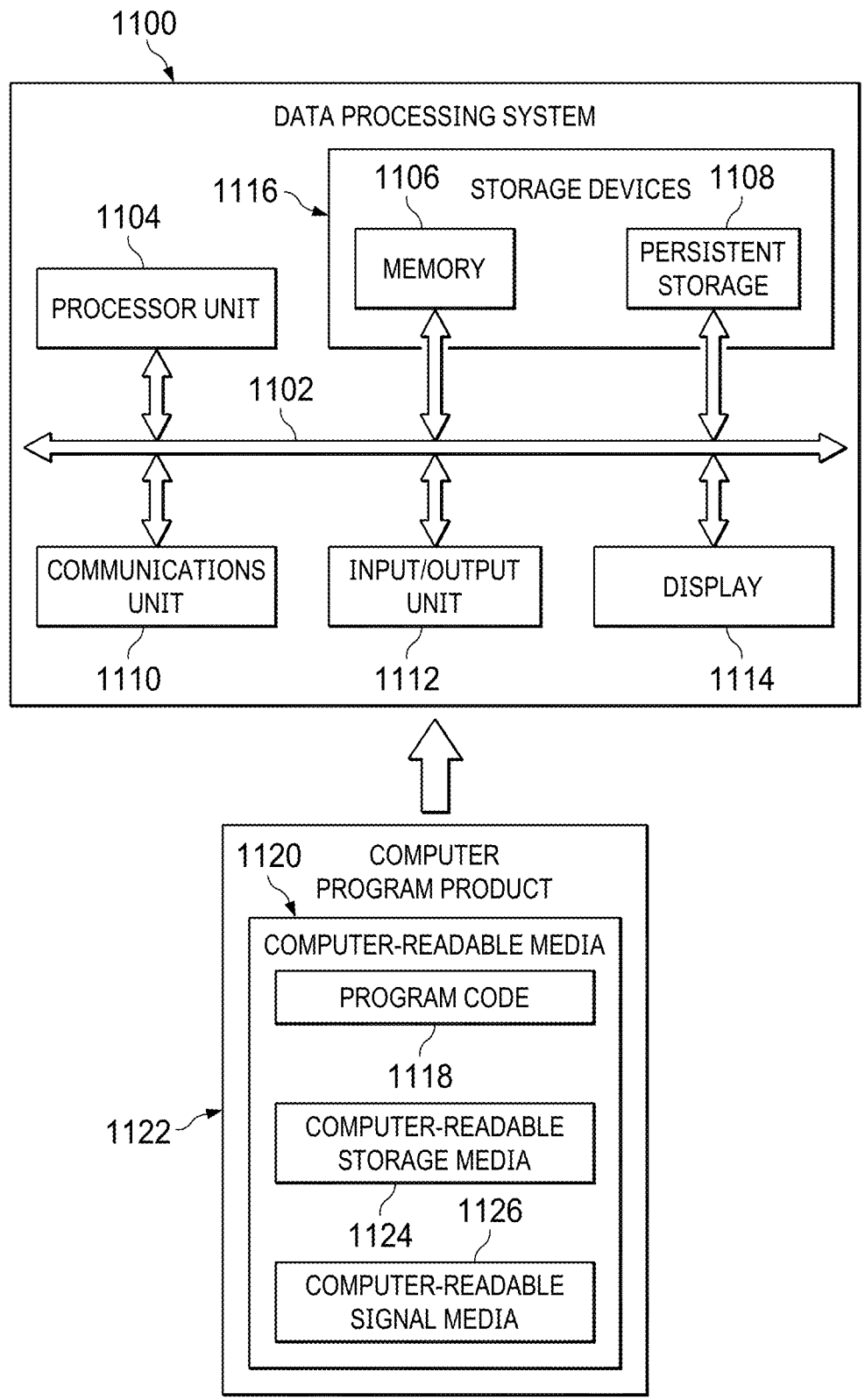
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement computer system 312 in FIG. 3. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that may be loaded into memory 1106. Processor unit 1104 may be a number of processors, a multi-processor core, or some other type of processor, depending on the particular implementation. In an embodiment, processor unit 1104 comprises one or more conventional general-purpose central processing units (CPUs). In an alternate embodiment, processor unit 1104 comprises one or more graphical processing units (GPUs).

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108. Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer-usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In one example, computer-readable media 1120 may be computer-readable storage media 1124 or computer-readable signal media 1126.

In these illustrative examples, computer-readable storage media 1124 is a physical or tangible storage device used to store program code 1118 rather than a medium that propagates or transmits program code 1118. Computer readable storage media 1124, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1118 may be transferred to data processing system 1100 using computer-readable signal media 1126. Computer-readable signal media 1126 may be, for example, a propagated data signal containing program code 1118. For example, computer-readable signal media 1126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

In some illustrative examples, computer program product 1122 for performing a modified differential evolution process to estimate crystallographic texture of an alloy is presented. Computer program product 1122 comprises computer-readable storage medium 1124 having program instructions embodied thereon to perform the steps of receiving material test data of a material sample of the alloy; and performing a modified differential evolution process including a reseed operation to estimate a plurality of Euler angles indicating the orientations of a specified quantity of crystals approximating the crystallographic texture extracted from the material test data; the reseed operation comprising retaining a data point at the first place of a first population of data points, and replacing all other data points of the first population of data points prior to continued iterations.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Figure 12A:
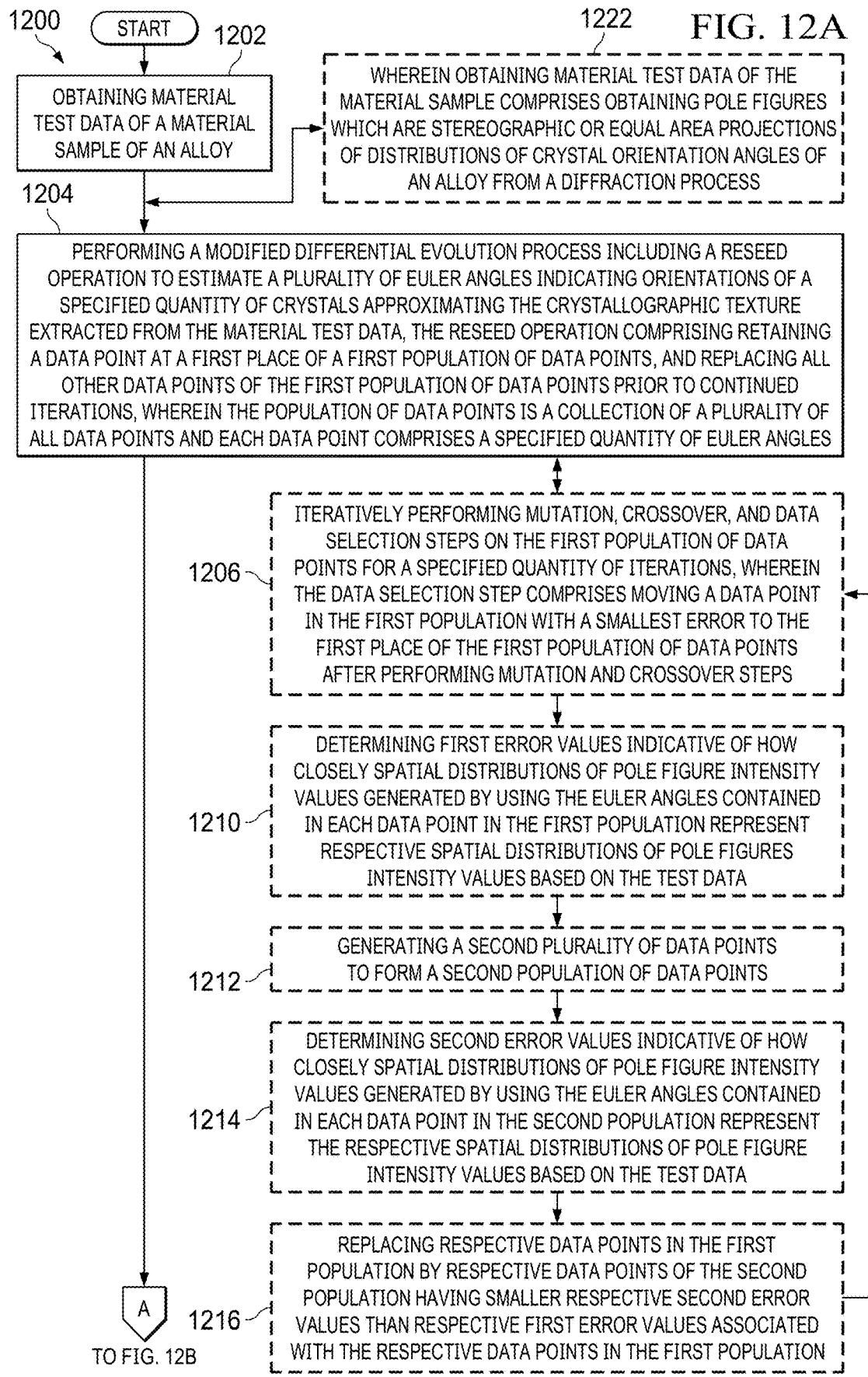
FIGS. 12A, 12B, and 12C are a flowchart of a method of estimating crystallographic texture of an alloy in accordance with an illustrative embodiment.
Figure 12B:
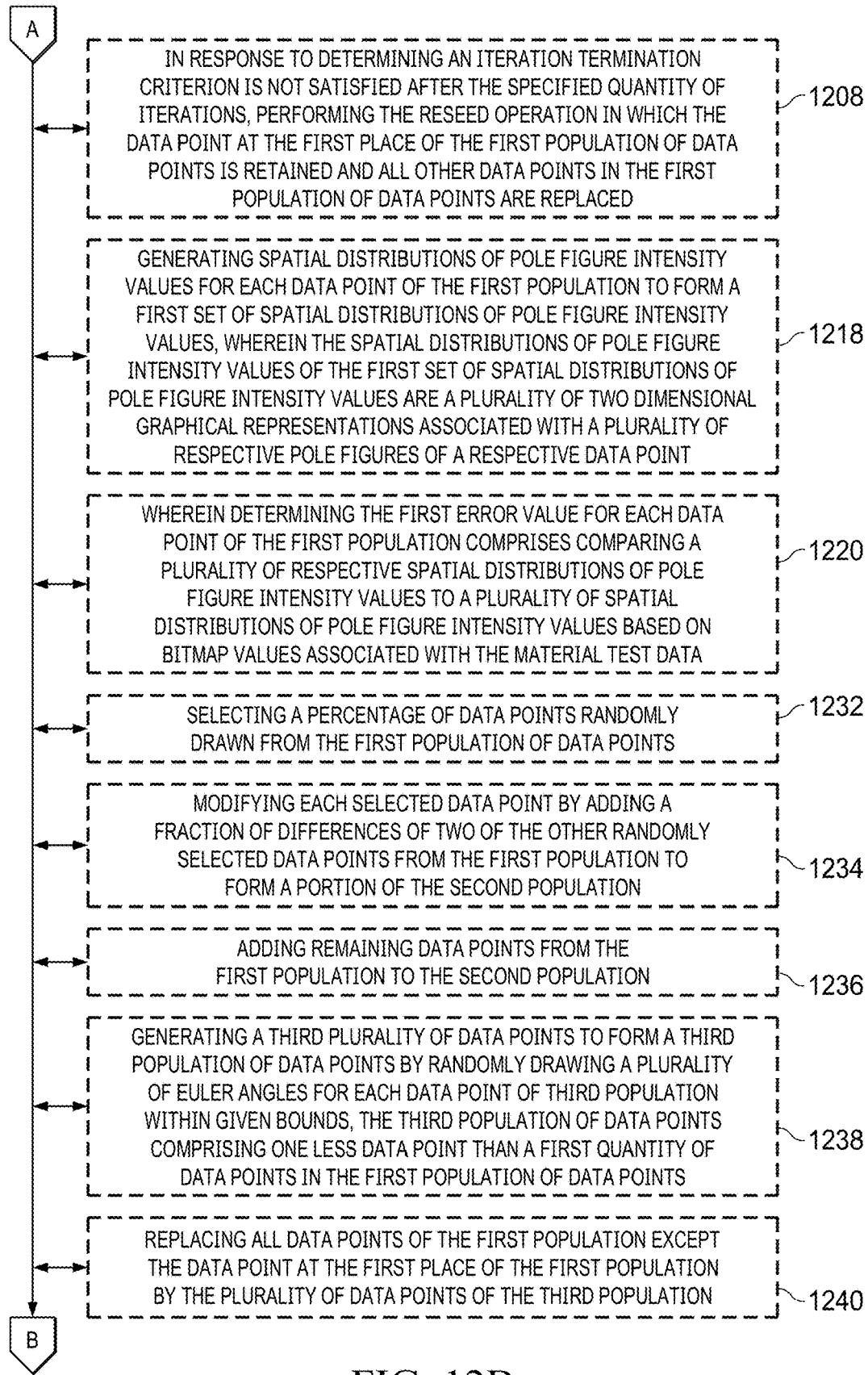
Figure 12C:
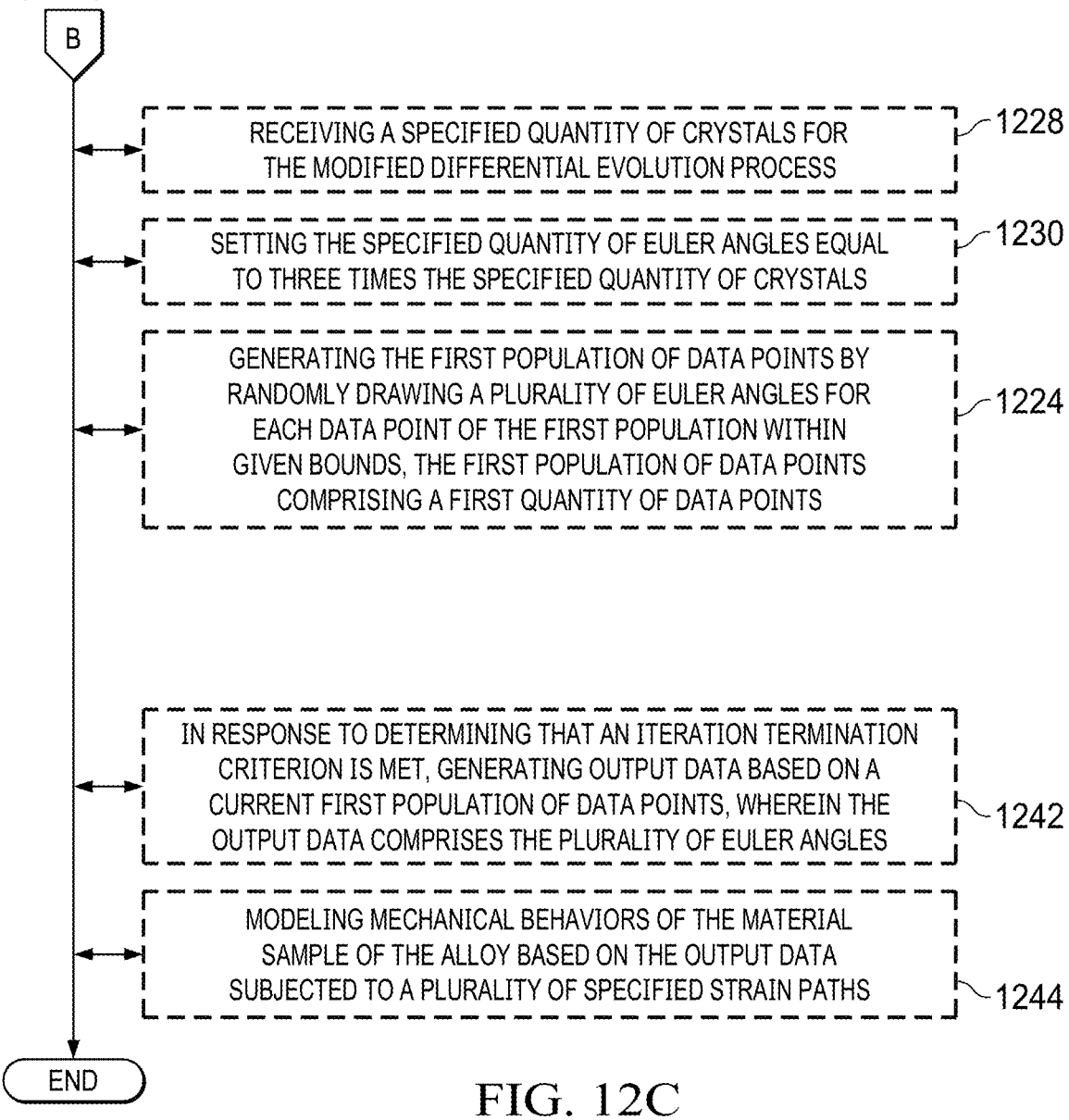

Turning now to FIGS. 12A, 12B, and 12C, a flowchart of a method of estimating crystallographic texture of an alloy is depicted in accordance with an illustrative embodiment. Method 1200 can be performed to determine material properties of a part of aircraft 100 of FIG. 1. In some illustrative examples, method 1200 can be an implementation of method 200 of FIG. 2. In some illustrative examples, method 1200 can perform aspects of a modified differential evolution process in FIGS. 4-9. In some illustrative examples, method 1200 can be implemented in testing environment 300 of FIG. 3. In some illustrative examples, method 1200 can be implemented using pole figures 1011, 1021, or 1031 of FIGS. 10A, 10B, and 10C as input. In some illustrative examples, method 1200 can be implemented to generate pole figures 1012, 1022, or 1032 of FIGS. 10A, 10B, and 10C as output.

Method 1200 obtains material test data of a material sample of an alloy (operation 1202). Method 1200 performs a modified differential evolution process including a reseed operation to estimate a plurality of Euler angles indicating orientations of a specified quantity of crystals approximating the crystallographic texture extracted from the material test data, the reseed operation comprising retaining a data point at a first place of a first population of data points, and replacing all other data points of the first population of data points prior to continued iterations, wherein the first population of data points is a collection of a plurality of all data points and each data point comprises the specified quantity of Euler angles (operation 1204). Afterwards, method 1200 terminates.

In some illustrative examples, performing the modified differential evolution process comprises iteratively performing mutation, crossover, and data selection steps on the first population of data points for a specified quantity of iterations, wherein the data selection step comprises moving a data point in the first population of data points with a smallest error to the first place of the first population of data points after performing mutation and crossover steps (operation 1206); and in response to determining an iteration termination criterion is not satisfied after the specified quantity of iterations, performing the reseed operation in which the data point at the first place of the first population of data points is retained and all other data points in the first population of data points are replaced (operation 1208).

In some illustrative examples, the mutation, crossover, and data selection steps comprise: determining first error values indicative of how closely spatial distributions of pole figure intensity values generated by using the Euler angles contained in each data point in the first population of data points represent respective spatial distributions of pole figure intensity values based on the material test data (operation 1210); generating a second plurality of data points to form a second population of data points (operation 1212); determining second error values indicative of how closely the spatial distributions of pole figure intensity values generated by using the Euler angles contained in each data point in the second population of data points represent the respective spatial distributions of pole figure intensity values based on the material test data (operation 1214); and replacing respective data points in the first population of data points by respective data points of the second population of data points having smaller respective second error values than respective first error values associated with the respective data points in the first population of data points (operation 1216).

In some illustrative examples, the material test data comprises at least one pole figure, and method 1200 further comprises generating spatial distributions of pole figure intensity values for each data point of the first population of data points to form a first set of spatial distributions of pole figure intensity values, wherein the spatial distributions of pole figure intensity values of the first set of spatial distributions of pole figure intensity values are a plurality of two-dimensional graphical representations associated with a plurality of respective pole figures of a respective data point (operation 1218). In some illustrative examples, wherein determining the first error value for each data point of the first population of data points comprises comparing a plurality of respective spatial distributions of pole figure intensity values to a plurality of spatial distributions of pole figure intensity values based on bitmap values associated with the material test data (operation 1220). In some illustrative examples, wherein determining the first error value for each data point of the first population of data points comprises comparing a plurality of respective spatial distributions of pole figure intensity values to a plurality of spatial distributions of pole figure intensity values generated by using the bitmap values of measured color scale pole figures associated with the material test data. In some illustrative examples, wherein determining the first error value for each data point of the first population of data points comprises comparing a plurality of respective spatial distributions of pole figure intensity values to a plurality of spatial distributions of pole figure intensity values generated using the Red, Green, Blue (RGB) values from the pole figures associated with the material test data, in conjunction with the color map used to generate the pole figures associated with the material test data.

In some illustrative examples, obtaining material test data of the material sample comprises obtaining pole figures which are stereographic or equal area projections of distributions of crystal orientation angles of an alloy from a diffraction process (operation 1222).

In some illustrative examples, performing the modified differential evolution process further comprises generating the first population of data points by randomly generating a plurality of Euler angles for each data point of the first population of data points within given bounds, the first population of data points comprising a first quantity of data points (operation 1224).

In some illustrative examples, method 1200 receives a specified quantity of crystals for the modified differential evolution process (operation 1228). In some illustrative examples, method 1200 sets the specified quantity of Euler angles equal to three times the specified quantity of crystals (operation 1230).

In some illustrative examples, generating the second population of data points comprises selecting a percentage of data points randomly drawn from the first population of data points (operation 1232); modifying each selected data point by adding a fraction of differences of two of the other randomly selected data points from the first population of data points to form a portion of the second population of data points (operation 1234); and adding remaining data points from the first population of data points to the second population of data points (operation 1236).

In some illustrative examples, performing the reseed operation comprises: generating a third plurality of data points to form a third population of data points by randomly drawing a plurality of Euler angles for each data point of third population of data points within given bounds, the third population of data points comprising one less data point than a first quantity of data points in the first population of data points (operation 1238); and replacing all data points of the first population of data points except the data point at the first place of the first population of data points by the third plurality of data points of the third population of data points (operation 1240).

In some illustrative examples, method 1200 in response to determining that an iteration termination criterion is met, generates output data based on a current first population of data points, wherein the output data comprises the plurality of Euler angles (operation 1242). In some illustrative examples, method 1200 models mechanical behaviors of the alloy of the material sample based on the output data subjected to a plurality of specified strain paths (operation 1244). In some illustrative examples, the alloy is one of a plurality of alloys, and a modified differential evolution process including a reseed operation is performed on the respective material test data of each alloy of the plurality of alloys. In some illustrative examples, an alloy satisfying a plurality of design requirements is selected from the plurality of alloys based on the modeling of the stress behaviors of the respective alloy.

Figure 13:
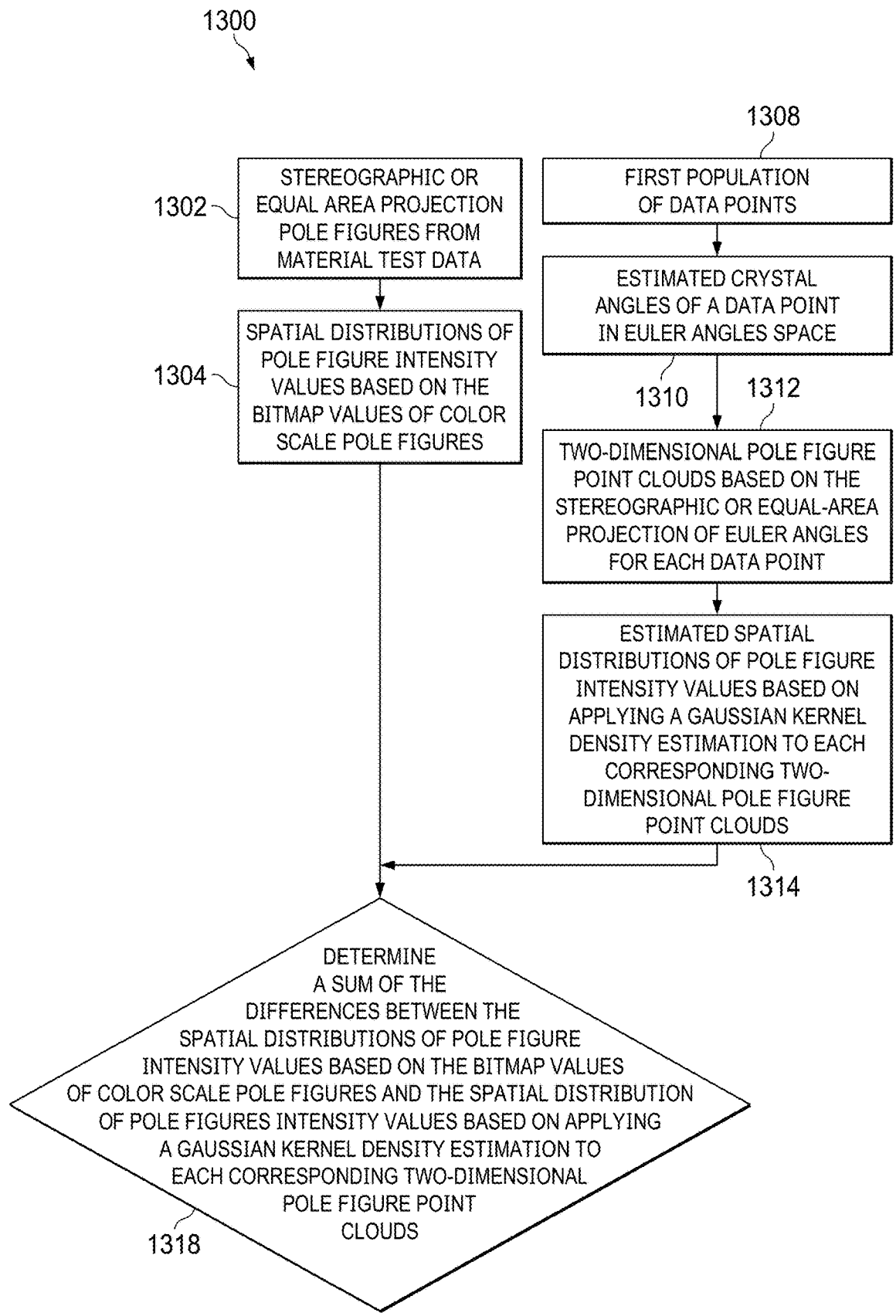
FIG. 13 is a flowchart of a method of determining error values in accordance with an illustrative embodiment.

Turning now to FIG. 13, a flowchart of a method of determining error values for a first population of data points is depicted in accordance with an illustrative embodiment. Flowchart 1300 can be used during selection 220 of FIG. 2. Flowchart 1300 can be performed according to data selection instructions 340 of FIG. 3. Flowchart 1300 can be performed on first population of data points 401 of FIGS. 4-9 to perform data selection as depicted in FIGS. 7-9. Although flowchart 1300 is described as determining error values for a first population of data points, the method depicted in flowchart 1300 can be performed on any desirable population of data points.

Stereographic or equal area projection pole figures from material test data are received 1302. The stereographic or equal area projection pole figures are generated from a material sample of an alloy. The stereographic or equal area projection pole figures are generated from a diffraction machine such as an electron back-scatter diffraction machine. Spatial distributions of pole figure intensity values are generated based on the bitmap values of color scale pole figures at 1304. In some illustrative examples, the spatial distribution of pole figure intensity values are a series of values located in positions in the two-dimensional projection based on the bitmap values of the color scale pole figures.

First population of data points 1308 is provided from the modified differential evolution process. The first population of data points 1308 can be first population of data points 334 of FIG. 3. Estimated crystal angles of a data point in Euler angle space 1310 are determined for each data point in the first population of data points.

Pole figures are estimated by first computing the stereographic or equal-area projection of Euler angles for each data point in the population of data points onto a plurality of specified planes to form a plurality of corresponding two-dimensional pole figure point clouds 1312. Spatial distributions of pole figure intensity values 1314 are estimated by applying a Gaussian kernel density estimation to each corresponding two-dimensional pole figure point clouds from 1312.

A sum of the differences between the spatial distributions of pole figure intensity values is determined 1318. The sum of the differences is determined by comparing the spatial distributions of pole figure intensity values based on the bitmap values of color scale pole figures at 1304 with the spatial distributions of pole figure intensity values 1314 based on applying a Gaussian kernel density estimation to each corresponding two-dimensional pole figure point clouds from 1312.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination of items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operations 1210 through operation 1220 may be optional.

Figure 14:
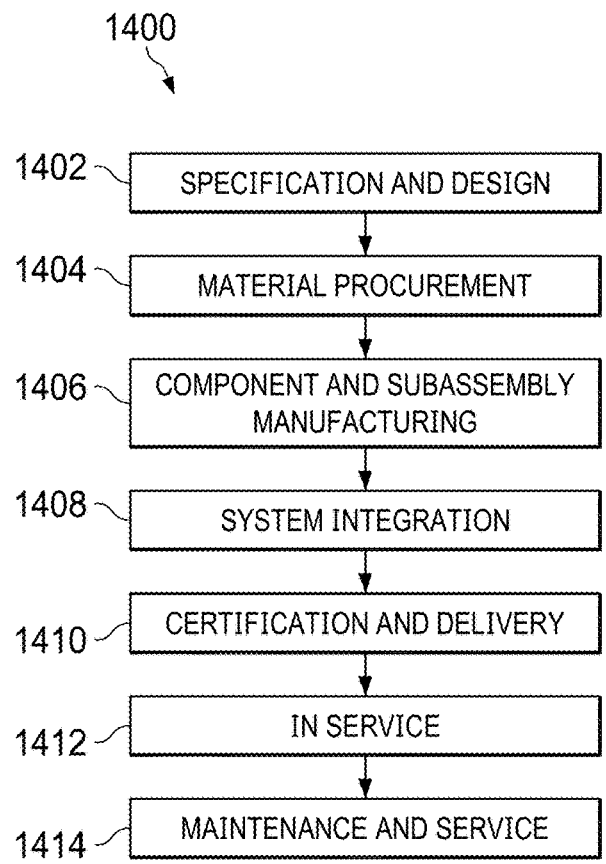
FIG. 14 is an illustration of an aircraft manufacturing and service method in a form of a block diagram in accordance with an illustrative embodiment.
Figure 15:
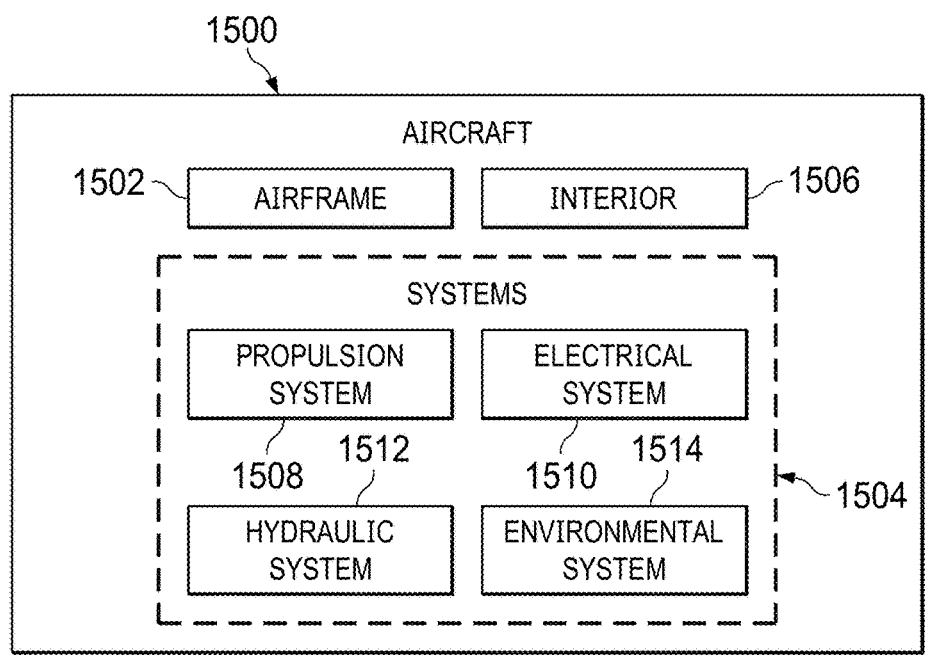
FIG. 15 is an illustration of an aircraft in a form of a block diagram in which an illustrative embodiment may be implemented.

Illustrative embodiments of the present disclosure may be described in the context of aircraft manufacturing and service method 1400 as shown in FIG. 14 and aircraft 1500 as shown in FIG. 15. Turning first to FIG. 14, an illustration of an aircraft manufacturing and service method in a form of a block diagram is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 takes place. Thereafter, aircraft 1500 may go through certification and delivery 1410 in order to be placed in service 1412. While in service 1412 by a customer, aircraft 1500 is scheduled for routine maintenance and service 1414, which may include modification, reconfiguration, refurbishment, or other maintenance and service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft in a form of a block diagram is depicted in which an illustrative embodiment may be implemented. In this example, aircraft 1500 is produced by aircraft manufacturing and service method 1400 of FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included.

Apparatuses and methods embodied herein may be employed during at least one of the stages of aircraft manufacturing and service method 1400. One or more illustrative embodiments may be manufactured or used during at least one of component and subassembly manufacturing 1406, system integration 1408, in service 1412, or maintenance and service 1414 of FIG. 14.

The illustrative examples provide a method of estimating a plurality of Euler angles representing the crystallographic texture of an alloy from a plurality of pole figures or some stereographic or equal area projections of crystal orientations at reduced dimension. The illustrative examples present a novel evolutionary optimization algorithm named as the modified differential evolution process. The output Euler angles of the modified differential evolution process can then be used, for example, as input for the advanced crystal-scale material model (ACSMM) to assess or otherwise determine material properties of a new or existing alloy, and to analyze or simulate parts, structures and/or manufacturing processes.

The illustrative examples provide a novel evolutionary algorithm named as the modified differential evolution process that can be used to automatically estimate crystallographic texture of an alloy. In contrast to the harmonic method based on a conventional gradient based optimization process, the illustrative examples do not require differentiability of the objective or other functions (e.g. constraint functions). The modified differential evolution process is a derivative-less optimization technique which can handle many complex (and non-convex) problems.

Compared to the harmonic method, the modified differential evolution process of the illustrative examples is more generalized. The illustrative examples show that the modified differential evolution process can estimate crystallographic texture of an alloy with any type of crystal structure including body-centered cubic, face-centered cubic and hexagonal close-packed crystals, without any modifications. The illustrative examples show the modified differential evolution process is able to find optimal solutions without producing unrealistic results, such as negative value for the functions representing crystal orientation distributions.

The illustrative examples have a greater chance to find global optimal solutions for high dimensional optimization problem due to the reseed operation. Conventional evolutionary algorithms can be trapped in local optima when solving such high dimensional optimization problem.

The illustrative examples provide a modified optimization algorithm able to find global optimal solutions and is able to handle high dimensional problems. The illustrative examples present a modified differential evolution process that can be used to automatically estimate crystal orientation angles. The illustrative examples present a modified differential evolution process capable of handling a high dimensional optimization problem.

The illustrative examples can output the Euler angles which can be used as input for an advanced crystal-scale material model (ACSMM) which can subsequently be used to simulate or otherwise predict the material response of a part constructed from a specified alloy or alloys to loading. This simulation could then be used, for example, to drive a virtual material testing suite, optimize a manufacturing process and/or design a part. Simulating designs and/or processes reduces wasted material and labor costs that would otherwise be needed to test the designs and processes physically.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of estimating a crystallographic texture of an alloy comprising:
    obtaining material test data of a material sample of the alloy; and
    performing a modified differential evolution process including a reseed operation to estimate a plurality of Euler angles indicating orientations of a specified quantity of crystals approximating the crystallographic texture extracted from the material test data, the reseed operation comprising retaining a data point at a first place of a first population of data points, and replacing all other data points of the first population of data points prior to continued iterations, wherein the first population of data points is a collection of a plurality of data points, each data point comprises a specified quantity of Euler angles, and the data point at the first place of the first population of data points is the data point within the first population of data points that best fits the material test data.

2. The method of claim 1, wherein performing the modified differential evolution process comprises:
    iteratively performing mutation, crossover, and data selection steps on the first population of data points for a specified quantity of iterations, wherein the data selection step comprises moving a data point in the first population of data points with a smallest error to the first place of the first population of data points after performing mutation and crossover steps; and
    in response to determining an iteration termination criterion is not satisfied after the specified quantity of iterations, performing the reseed operation in which the data point at the first place of the first population of data points is retained and all other data points in the first population of data points are replaced.

3. The method of claim 2, wherein the mutation, crossover, and data selection steps comprise:
    determining first error values indicative of how closely spatial distributions of pole figure intensity values generated using the Euler angles contained in each data point in the first population of data points represent the respective spatial distributions of pole figure intensity values based on the material test data;
    generating a second plurality of data points to form a second population of data points;
    determining second error values indicative of how closely spatial distributions of pole figure intensity values generated using the Euler angles contained in each data point in the second population of data points represent the respective spatial distributions of pole figure intensity values based on the material test data; and
    replacing respective data points in the first population of data points by respective data points of the second population of data points having smaller respective second error values than respective first error values associated with the respective data points in the first population of data points.

4. The method of claim 3, wherein the material test data comprises at least one pole figure, the method further comprising:
    generating spatial distributions of pole figure intensity values for each data point of the first population of data points to form a first set of spatial distributions of pole figure intensity values, wherein the spatial distributions of pole figure intensity values are a plurality of two-dimensional graphical representations associated with a plurality of respective estimated pole figures of a respective data point; and
    wherein determining a first error value for each data point of the first population of data points comprises comparing a plurality of respective spatial distributions of pole figure intensity values for each data point to the respective spatial distributions of pole figure intensity values based on bitmap values associated with the material test data.

5. The method of claim 1, wherein obtaining material test data of the material sample comprises obtaining pole figures which are stereographic or equal area projections representing crystallographic texture of an alloy from a diffraction process, wherein crystallographic texture comprises distributions of crystal orientation angles.

6. The method of claim 1, wherein performing the modified differential evolution process further comprises:
    generating the first population of data points by randomly drawing a plurality of Euler angles for each data point of the first population of data points within given bounds, the first population of data points comprising a first quantity of data points.

7. The method of claim 6 further comprising:
receiving a specified quantity of crystals for the modified differential evolution process; and
setting the specified quantity of Euler angles equal to three times the specified quantity of crystals.

8. The method of claim 3, wherein generating the second population of data points comprises:
selecting a percentage of data points randomly drawn from the first population of data points;
modifying each selected data point by adding a fraction of differences of two of the other randomly selected data points from the first population of data points to form a portion of the second population of data points; and
adding remaining data points from the first population of data points to the second population of data points.

9. The method of claim 1, wherein performing the reseed operation comprises:
generating a third plurality of data points to form a third population of data points by randomly drawing a plurality of Euler angles for each data point of third population of data points within given bounds, the third population of data points comprising a one less data point than a first quantity of data points in the first population of data points; and
replacing all data points of the first population of data points except the data point at the first place of the first population of data points by the third plurality of data points of the third population of data points.

10. The method of claim 1 further comprising:
in response to determining that an iteration termination criterion is met, generating output data based on a current first population of data points, wherein the output data comprises the plurality of Euler angles.

11. The method of claim 10, further comprising:
modelling mechanical behaviors of the material sample of the alloy based on the output data subjected to a plurality of specified strain paths.

12. A computer program product for performing a modified differential evolution process to estimate crystallographic texture of an alloy, the computer program product comprising:
a computer-readable storage medium having program instructions embodied thereon to perform the steps of:
receiving material test data of a material sample of the alloy; and
performing a modified differential evolution process including a reseed operation to estimate a plurality of Euler angles indicating orientations of a specified quantity of crystals approximating the crystallographic texture extracted from the material test data; the reseed operation comprising retaining a data point at a first place of a first population of data points, and replacing all other data points of the first population of data points prior to continued iterations.

13. The computer program product of claim 12, wherein the program instructions include instructions configured to perform the steps of:
receiving a specified quantity of crystals for the modified differential evolution process; and
setting a specified quantity of Euler angles equal to three times of specified quantity of crystals, wherein each data point of the first population of data points comprises the specified quantity of Euler angles.

14. The computer program product of claim 12, wherein the program instructions for performing the modified differential evolution process include instructions configured to perform the steps of:
iteratively performing mutation, crossover, and data selection steps on the first population of data points for a specified quantity of iterations, wherein the data selection step comprises moving a data point in the first population of data points having a smallest error to the first place of the first population of data points after performing mutation and crossover steps; and
in response to determining an iteration termination criterion is not satisfied after the specified quantity of iterations, performing the reseed operation in which the first place of the first population of data points is retained and all other data points in the first population of data points are replaced.

15. The computer program product of claim 12, wherein the program instructions for performing the reseed operation include instructions configured to perform the steps of:
generating a third plurality of data points to form a third population of data points by randomly drawing a plurality of Euler angles for each data point of the third population of data points within given bounds, the third population of data points comprising a one less data point than a first quantity of data points in the first population of data points; and
replacing all data points of the first population of data points except the data point at the first place by the third plurality of data points of the third population of data points.

16. A system for performing a modified differential evolution process to estimate crystallographic texture of an alloy comprising:
a storage device that stores program instructions;
a number of processors operably connected to the storage device and configured to execute the program instructions to cause the system to:
receive material test data of a material sample of the alloy; and
perform a modified differential evolution process including a reseed operation to estimate a plurality of Euler angles indicating orientations of a specified quantity of crystals approximating the crystallographic texture extracted from the material test data; the reseed operation comprising retaining a data point at a first place of a first population of data points, and replacing all other data points of the first population of data points prior to continued iterations.

17. The system of claim 16, wherein the program instructions further cause the system to:
in response to determining that an iteration termination criterion is met, generate output data based on a current first population of data points.

18. The system of claim 17, wherein the program instructions further cause the system to:
display, in a user interface, pole figures generated from material test data of a material sample from a diffraction process; and
display, in the user interface, estimated pole figures generated from the output data.

19. The system of claim 18, wherein the program instructions further cause the system to:
model mechanical behaviors of the material sample of the alloy based on the output data subjected to a plurality of specified strain paths.

20. The system of claim 16, wherein the program instructions to cause the system to perform the modified differential evolution process comprise program instructions to cause the system to:
    iteratively perform mutation, crossover, and data selection steps on the first population of data points for a specified quantity of iterations, wherein the data selection step comprises moving a data point in the first population of data points having a smallest error to the first place of the first population of data points after performing mutation and crossover steps; and
    in response to determining an iteration termination criterion is not satisfied after the specified quantity of iterations, perform the reseed operation in which the first place of the first population of data points is retained and all other data points in the first population of data points are replaced.

\* \* \* \* \*